US011850605B2

(12) United States Patent
Elsaadawy

(10) Patent No.: US 11,850,605 B2
(45) Date of Patent: Dec. 26, 2023

(54) APPARATUS AND METHOD TO SEPARATE AND CONDITION MULTIPHASE FLOW

(71) Applicant: Saudi Arabian Oil Company, Dhahran (SA)

(72) Inventor: Ehab Elsaadawy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/684,068

(22) Filed: Mar. 1, 2022

(65) Prior Publication Data

US 2023/0278045 A1 Sep. 7, 2023

(51) Int. Cl.
| | |
|---|---|
| *B04C 5/04* | (2006.01) |
| *B04C 5/28* | (2006.01) |
| *B01D 19/00* | (2006.01) |
| *B04C 5/181* | (2006.01) |
| *B04C 5/13* | (2006.01) |

(52) U.S. Cl.
CPC ............ *B04C 5/28* (2013.01); *B01D 19/0057* (2013.01); *B04C 5/04* (2013.01); *B04C 5/13* (2013.01); *B04C 5/181* (2013.01)

(58) Field of Classification Search
CPC .... B04C 5/28; B04C 5/04; B04C 5/13; B04C 5/181; B01D 19/0057
See application file for complete search history.

(56) References Cited

U.S. PATENT DOCUMENTS

| | | | | | |
|---|---|---|---|---|---|
| 1,344,146 | A | * | 6/1920 | Peck ......................... | B04C 1/00 209/722 |
| 1,753,502 | A | * | 4/1930 | Clark ........................ | B04C 5/12 55/427 |
| 2,033,471 | A | * | 3/1936 | Keenan ..................... | B04C 5/04 209/722 |
| 2,222,930 | A | * | 11/1940 | Arnold ...................... | B04C 5/00 55/416 |
| 2,849,079 | A | * | 8/1958 | Evans ...................... | B04C 5/103 96/408 |

(Continued)

FOREIGN PATENT DOCUMENTS

| | | |
|---|---|---|
| EP | 0473566 | 3/1992 |
| EP | 1896158 | 7/2014 |

(Continued)

OTHER PUBLICATIONS

"ANSYS FLUENT™ Theory Guide," Canonsburg, PA, Ansys Inc., 2020, 1026 pages.

(Continued)

*Primary Examiner* — Dung H Bui
(74) *Attorney, Agent, or Firm* — Fish & Richardson P.C.

(57) ABSTRACT

A separator apparatus includes an intake nozzle, first cyclone device, and a second cyclone device. The first and second cyclone devices each include an inlet section, a scroll, a barrel centered on a first axis, a vortex finder, and an underflow portion. The scroll is attached to the inlet section and to the barrel such that the scroll connects the inlet section to the barrel. The vortex finder has a vortex tube arranged concentrically on the axis in an interior volume of barrel. The underflow portion defines an annular gap in fluid connection with the interior volume. The intake nozzle is fluidly connected to the inlet sections of the first and second cyclone devices.

34 Claims, 13 Drawing Sheets

(56) References Cited

U.S. PATENT DOCUMENTS

| | | | | |
|---|---|---|---|---|
| 3,675,401 A * | 7/1972 | Cordes | B04C 5/103 | 55/459.1 |
| 3,802,570 A * | 4/1974 | Dehne | B04C 5/14 | 209/733 |
| 3,822,533 A * | 7/1974 | Oranje | B01D 45/16 | 55/394 |
| 3,865,242 A | 2/1975 | Musto | | |
| 3,953,184 A * | 4/1976 | Stockford | B01D 45/12 | 55/459.3 |
| 3,969,096 A | 7/1976 | Richard | | |
| 3,989,485 A * | 11/1976 | Kilian | B01D 50/00 | 95/219 |
| 4,070,168 A | 1/1978 | Beattie | | |
| 4,212,653 A * | 7/1980 | Giles | B01D 45/16 | 95/271 |
| 4,617,031 A | 10/1986 | Suh et al. | | |
| 4,692,311 A * | 9/1987 | Parker | B04C 9/00 | 96/372 |
| 4,778,494 A | 10/1988 | Patterson | | |
| 4,865,633 A * | 9/1989 | Stevenson | B04C 5/04 | 55/393 |
| 4,971,685 A * | 11/1990 | Stanley | B04C 5/04 | 210/512.1 |
| 5,116,488 A * | 5/1992 | Torregrossa | B03D 1/1475 | 209/733 |
| 5,391,294 A * | 2/1995 | Mercier | B04C 5/081 | 210/195.3 |
| 5,518,695 A * | 5/1996 | Goodspeed | B04C 5/02 | 55/318 |
| 5,669,948 A * | 9/1997 | Brottgårdh | B04C 5/103 | 55/459.1 |
| 6,458,191 B1 | 10/2002 | Lingelem et al. | | |
| 6,758,343 B1 * | 7/2004 | Soto | B04C 5/103 | 209/729 |
| 6,773,492 B1 | 8/2004 | West | | |
| 6,830,734 B1 * | 12/2004 | Dirkse | B01J 8/0055 | 422/147 |
| 6,926,749 B1 * | 8/2005 | Tenney | B01D 45/16 | 95/271 |
| 6,979,360 B1 * | 12/2005 | Cetinkaya | C10G 11/182 | 95/271 |
| 8,104,622 B2 * | 1/2012 | Soto | B04C 5/13 | 209/732 |
| 8,192,614 B2 * | 6/2012 | Niccum | B01J 8/0055 | 208/113 |
| 8,323,383 B2 * | 12/2012 | Evans | B07B 7/086 | 55/420 |
| 8,337,603 B2 | 12/2012 | Akhras et al. | | |
| 8,733,400 B2 | 5/2014 | Muggli et al. | | |
| 8,785,898 B2 | 7/2014 | Li et al. | | |
| 9,168,475 B2 | 10/2015 | Dorao et al. | | |
| 9,266,042 B2 | 2/2016 | Kvamsdal et al. | | |
| 9,795,898 B2 | 10/2017 | Ernst et al. | | |
| 10,213,794 B1 * | 2/2019 | Miller | B04C 5/14 | |
| 10,596,580 B2 | 3/2020 | King | | |
| 2004/0211734 A1 * | 10/2004 | Moya | B01D 21/0036 | 210/512.1 |
| 2005/0126394 A1 * | 6/2005 | Reiling | B01J 8/0055 | 95/271 |
| 2005/0229554 A1 * | 10/2005 | Oh | B01D 45/16 | 55/346 |
| 2006/0049120 A1 * | 3/2006 | Antoun | B04C 9/00 | 210/787 |
| 2006/0137303 A1 * | 6/2006 | Jeong | B04C 5/24 | 55/337 |
| 2010/0180768 A1 * | 7/2010 | Folkvang | B04C 5/103 | 210/194 |
| 2011/0247500 A1 * | 10/2011 | Akhras | B01D 17/0217 | 96/182 |
| 2011/0294643 A1 * | 12/2011 | Ford | B04C 5/107 | 494/56 |
| 2012/0180662 A1 * | 7/2012 | Missalla | B04C 5/13 | 95/271 |
| 2012/0285322 A1 * | 11/2012 | Halpap | B04C 5/181 | 95/271 |
| 2013/0205730 A1 * | 8/2013 | Hofer | B04C 5/13 | 55/459.1 |
| 2013/0239811 A1 * | 9/2013 | Moen | B04C 5/103 | 96/207 |
| 2014/0158364 A1 | 6/2014 | Hopper | | |
| 2014/0170330 A1 * | 6/2014 | Foret | C04B 38/0022 | 427/457 |
| 2015/0265112 A1 * | 9/2015 | Chen | A47L 9/165 | 15/347 |
| 2018/0021701 A1 * | 1/2018 | Kulkarni | F01M 13/04 | 210/167.02 |
| 2018/0036653 A1 | 2/2018 | Ernst et al. | | |
| 2018/0085761 A1 * | 3/2018 | Dressler | C10J 3/723 | |
| 2018/0154375 A1 * | 6/2018 | Lamare | B04C 5/103 | |
| 2019/0022585 A1 * | 1/2019 | Patrick | B01D 59/20 | |
| 2019/0321834 A1 * | 10/2019 | Chen | B04C 5/103 | |
| 2019/0388907 A1 * | 12/2019 | Bowley | B04C 5/103 | |
| 2020/0001309 A1 * | 1/2020 | Kvamsdal | B04C 5/14 | |
| 2020/0016611 A1 * | 1/2020 | Kibler | B01D 21/32 | |
| 2020/0282334 A1 * | 9/2020 | Vissers | B01D 17/0217 | |
| 2021/0138379 A1 * | 5/2021 | Schafrik | B04C 5/081 | |
| 2021/0283623 A1 * | 9/2021 | Ernst | B04C 5/30 | |
| 2022/0071461 A1 * | 3/2022 | Tung | B01D 50/40 | |
| 2022/0288607 A1 * | 9/2022 | Banerjee | B04C 5/04 | |

FOREIGN PATENT DOCUMENTS

| | | |
|---|---|---|
| EP | 1871505 | 5/2016 |
| GB | 2248562 | 4/1992 |
| WO | WO 0218056 | 3/2002 |
| WO | WO 2011161433 | 12/2011 |

OTHER PUBLICATIONS

Chin, "The Savvy Separator Series: Part 1. Design of Cyclone Separators: Internals and Liquid Levels," Oil & Gas Facilities, Aug. 2015, 4(3):32-37, 6 pages.

Duan et al., "Effect of cylinder vortex stabilizer on separator performance of the Stairmand cyclone," Powder technology, Jul. 2020, 327:305-316, 40 pages.

Elsayed et al., "Modeling, analysis and optimization of aircyclones using artificial neural network, response surface methodology and CFD simulation approaches," Powder Technology, Sep. 2011, 212(1):115-133, 19 pages.

Ghodrat et al., "Numerical analysis of hydrocyclones with different conical section designs," Minerals Engineering, Jul. 2014, 62:74-84, 11 pages.

Hu et al., "Numerical investigation to optimize the inlet flow distributor of the intermediate heat exchanger in an HTGR," Nuclear Engineering and Design, Jan. 2020, 356:110363, 10 pages.

Jang et al., "Evaluation of the turbulence models for gas flow and particle transport in URANS and LES of a cyclone separator," Computers and Fluids, Aug. 2018, 172:274-283, 24 pages.

Kumar et al., "Multi-objective shape optimization of vortex finders in cyclone separators using response surface methodology and genetic algorithms," Separation and Purification Technology, May 2019, 215:25-31, 7 pages.

Liu et al., "Three-phase hydrocyclone separator—A review," Chemical Engineering Research and Design, Aug. 2015, 100:554-560, 16 pages.

Motin et al., "Design of liquid-liquid separation hydrocyclonesusing parabolic and hyperbolic swirl chambers for efficiency enhancement," Chemical Engineering Research and Design, Jun. 2017, 122:184-197, 31 pages.

Qiang et al., "Experimental and computational analysis of a cyclone separator with a novel vortex finder," Powder Technology, Jan. 2020, 360:398-410, 24 pages.

Shukla et al., "Evaluation of numerical schemes using different simulation methods for the continuous phase modeling of cyclone separators," Advanced Powder Technology, Mar. 2011, 22(2):209-219, 11 pages.

(56) References Cited

OTHER PUBLICATIONS

Stendal, "Multiphase Flows in Cyclone Separators—Modeling the classification and drying of solid particles using CFD," Thesis for the degree of Master of Science, Department of Chemical Engineering, Chalmers University of Technology, 2013, 60 pages.
Wasilewski, "Analysis of the effect of counter-cone location on cyclone separator efficiency," Separation and Purification Technology, May 2017, 179:236-247, 37 pages.
Zhang et al., "Effects of curvature radius on separation behaviors of the hydrocyclone with a tangent-circle inlet," Powder Technology, Jan. 2017, 305:156-165, 10 pages.
PCT International Search Report and Written Opinion in International Appln. No. PCT/US2023/014163, dated Jun. 21, 2023, 15 pages.

\* cited by examiner

APPARATUS AND METHOD TO SEPARATE AND CONDITION MULTIPHASE FLOW

TECHNICAL FIELD

This disclosure relates to systems and methods for separating multi-phase fluids.

BACKGROUND

Cyclonic separation is a method of removing particulates from an air, gas or liquid stream through vortex separation. When removing particulate matter from liquid, a hydrocyclone is used. When removing particulate from gas, a gas cyclone is used. Hydrocyclones are meant to be standalone separation systems. Rotational effects and gravity are used to separate mixtures of solids and fluids. The method can also be used to separate fine droplets of liquid from a gaseous stream.

Cyclonic inlets and diverters are used in oil production facilities to increase the operating capacity of multiphase gravity separators. Two-phase cyclones and hydrocyclones have been used in many industries.

SUMMARY

In certain aspects, a separator apparatus includes an intake nozzle, first cyclone device, and a second cyclone device. The first cyclone device has a first inlet section having a first end and a second end, a first scroll, a first barrel centered on a first axis, a first vortex finder, and a first underflow portion. The first scroll has a curved member A cross-sectional area of the first inlet section increases from the first end to the second end, The barrel defines a first interior volume, a diameter, a first end, and a second end. The first scroll is attached to the first inlet section and to the first barrel such that the first scroll connects the first inlet section to the first barrel. The first vortex finder has a first vortex tube arranged concentrically on the first axis in the first barrel. The first underflow portion includes a first conical member and a first underflow body. The first underflow portion defines a first annular gap in fluid connection with the first interior volume. The second cyclone device has a second inlet section having a first end and a second end, a second scroll, a second barrel centered on a second axis, a second vortex finder, and a second underflow portion. The second scroll has a curved member A cross-sectional area of the second inlet section increases from the first end to the second end. The barrel defines a second interior volume, a diameter, a first end, and a second end. The second scroll is attached to the second inlet section and to the second barrel such that the second scroll connects the second inlet section to the second barrel. The second vortex finder has a second vortex tube arranged concentrically on the second axis in the second barrel. The first underflow portion includes a second conical member and a second underflow body. The second underflow portion defines a second annular gap in fluid connection with the second interior volume. The intake nozzle is fluidly connected to the first inlet section and second inlet section.

In some apparatuses, a first conical member includes a first cone connected to the barrel at the second end. The first cone may have a first diameter at a first end and a second diameter at a second end. The first diameter may be equal to the diameter of the barrel. The first diameter can be greater than the second diameter. Some curved member are circular ramps. In some embodiments, first underflow body includes an inner cylinder having an exterior surface and an interior surface. The exterior surface of the inner cylinder and the first end of the first cone may define the first annular gap. In some cases, the first underflow portion further includes a first insert, with a diameter, arranged in the underflow body. In some embodiments, the inner cylinder defines an opening with a diameter. The diameter of the opening can be equal to the diameter of the first insert. Some first cyclone device also have a stabilizer attached to the first insert. The stabilizer can include an arm, attached at a first end to the first insert, and a vortex breaker attached to a second end of the arm. In some embodiments, the second underflow portion include a second cone connected to the barrel at the second end. The cone can have a first diameter at a first end and a second diameter at a second end. The first diameter may be equal to the diameter of the barrel. The first diameter may be greater than the second diameter, and a second underflow body defining the second annular gap.

In some apparatuses, the second conical member includes a second cone connected to the barrel at the second end and a second underflow body. The second cone may have a first diameter at a first end and a second diameter at a second end. The first diameter can be equal to the diameter of the barrel. In some cases, the first diameter is greater than the second diameter. The second underflow body can include an inner cylinder having an exterior surface and an interior surface. The exterior surface of the inner cylinder and the second cone may define the second annular gap. The second underflow portion can also include a second insert, having a diameter, arranged in the underflow. Some interior surfaces of the inner cylinder define an opening with a diameter that are equal to the diameter of the second insert. The second cyclone device can also include a stabilizer attached to the second insert. Some stabilizers have an arm, attached at a first end to the second insert, and a vortex breaker attached to a second end of the arm.

In some embodiments, the first inlet section is adjacent the second inlet section. A divider may separate the first inlet section and the second inlet section.

Some apparatuses also include a first feed chamber defined in the annular space between the first barrel and the first vortex finder.

Some apparatuses also include a second feed chamber defined in the annular space between the second barrel and the second vortex finder.

In some cases, first vortex tube includes a first entrance in the first interior volume of the first barrel and a first discharge outlet, wherein the first discharge outlet extends through the first end of the first barrel. The second vortex tube can include a second entrance in the second interior volume of the second barrel and a second discharge outlet. The second discharge outlet may extend through the first end of the second barrel. Some second inlet sections are configured to receive a mixture having a first substance and a second substance. The second vortex tube can be configured to receive the first substance at the second entrance and discharge the first substance at the second discharge outlet. The first substance may be lighter than the second substance. The first inlet section may be configured to receive a mixture having a first substance and a second substance. The first vortex tube may be configured to receive the first substance at the first entrance and discharge the first substance at the first discharge outlet. Some first substances are lighter than the second substances.

In some cases, the first scroll has a first end fluidly connected to the first inlet section and a second end fluidly connected to the first interior volume of the first barrel. The cross sectional area of the first scroll may increase from the first end to the second end. In some cases, the second scroll has a first end fluidly connected to the second inlet section and a second end fluidly connected to the second interior volume of the second barrel. In some embodiments, the cross sectional area of the second scroll increases from the first end to the second end.

In some cases, the first vortex finder has a length that is about 1.1 times to about 1.3 times the diameter of the first barrel.

In some cases, the second vortex finder has a length that is about 1.1 times to about 1.3 times the diameter of the second barrel.

The first barrel may have a length of about 1.5 times the diameter of the first barrel.

The second barrel can have a length of about 1.5 times the diameter of the second barrel.

The first cone can have a length of about 1 to about 1.5 times the diameter of the first barrel.

The second cone can have a length of 1 to about 1.5 times the diameter of the second barrel.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

A separator apparatus (e.g., a dual cyclone separator, twin cyclone separator) for separating a gas-liquid mixture or a liquid-liquid mixture, for example, an oil-gas mixture is disclosed. The separator apparatus can be used with high momentum and medium to high Gas to Oil (GOR) well streams. The separator apparatus includes an inlet section a first cyclone body and a second cyclone body. Each cyclone body includes a scroll, a vortex finder (overflow section), a barrel, and an underflow portion. The mixture fluid is received at the inlet section and diverted into one of the two cyclone bodies. The cyclone bodies rotate the fluid mixture so that the fluid mixture separates, the denser fluid moving towards the edge of the barrel and the less dense fluid moving towards the center of the barrel. The less dense fluid exits via the vortex finder and the more dense fluid exits via the underflow portion. The separator apparatus can absorb the momentum of the incoming well stream to induce uniform flow into the cyclone bodies and reduce channeling through the downstream devices. The separator apparatus can reduce gas blow out (blow-by) at the underflow and suppress foam in the incoming fluid mixture stream. Further, the separator apparatus is symmetric and modular for simple manufacturing and is sized based on target vessel dimensions.

Figure 1:
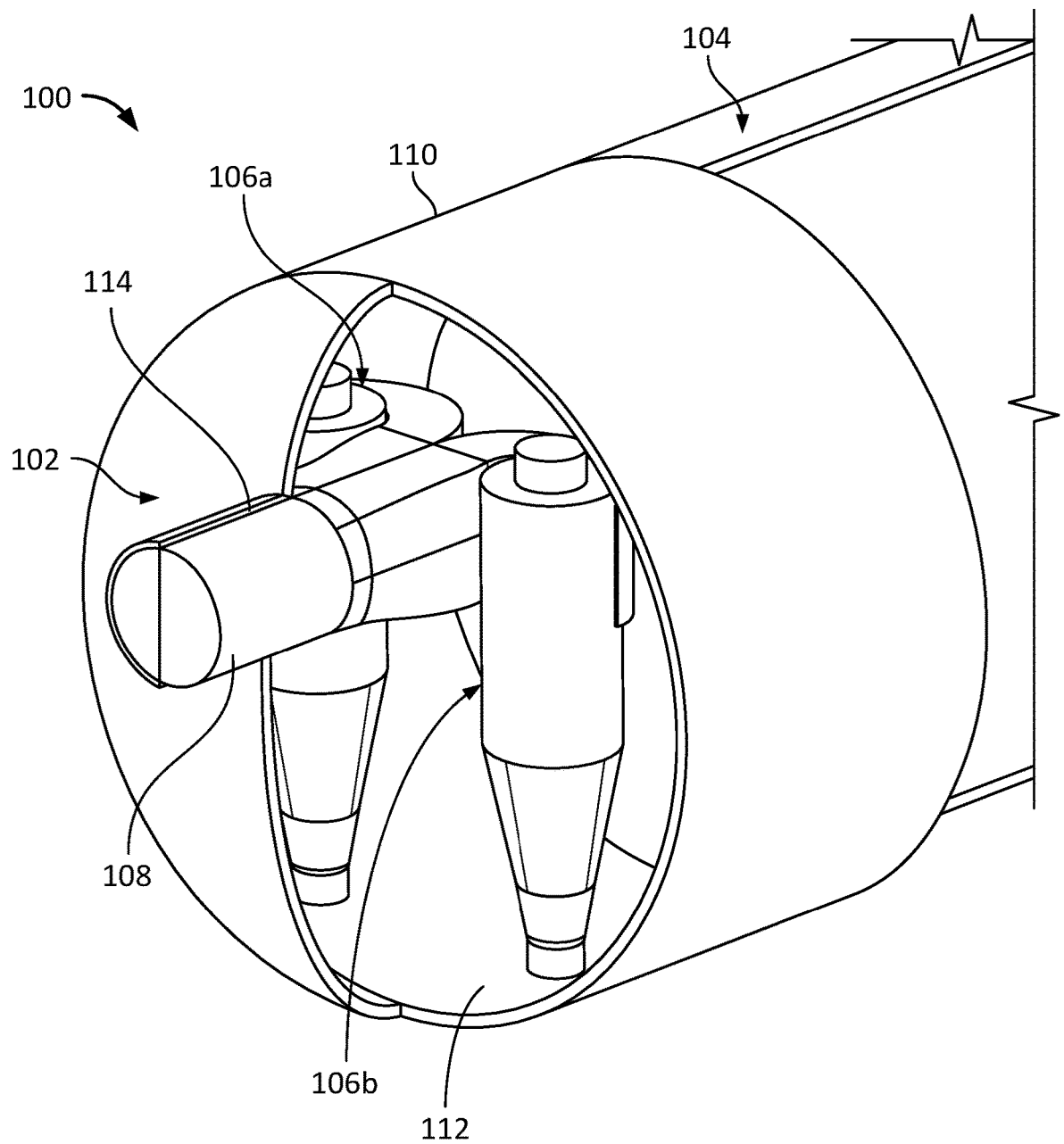
FIG. 1 is a perspective, cross-sectional view of a separator system having a separator apparatus arranged in a separator vessel.

FIG. 1 is a perspective, cross-sectional view of a separator system 100 having a separator apparatus 102 arranged in a separator vessel 104. The separator vessel 104 is configured to flow or contain a fluid mixture upstream of the separator apparatus 102. The fluid mixture may be a liquid-gas mixture or a liquid-liquid mixture. The separator vessel 104 is also configured to flow the separated fluid mixture downstream of the separator apparatus 102.

The separator apparatus 102 includes a first cyclone device 106a, a second cyclone device 106b, and an inlet nozzle 108. The inlet nozzle 108 has a diameter $D_{IN}$. The first and second cyclone devices 106a, 106b are identical and include the same components in the same configurations. The separator vessel 104 includes walls 110 that define an interior volume 112 and a nozzle casing 113 for housing the inlet nozzle 108. The inlet nozzle 108 of the separator apparatus 102 extends through an opening 114 defined in the walls 110 of the separator vessel 104 into the nozzle casing 113. A fluid mixture (e.g., gas-water mixture) enters the system 100 through the inlet nozzle 108. The separators apparatus 102 separates the gas and water, and discharges the gas and water into the separators vessel 104.

Figure 2:
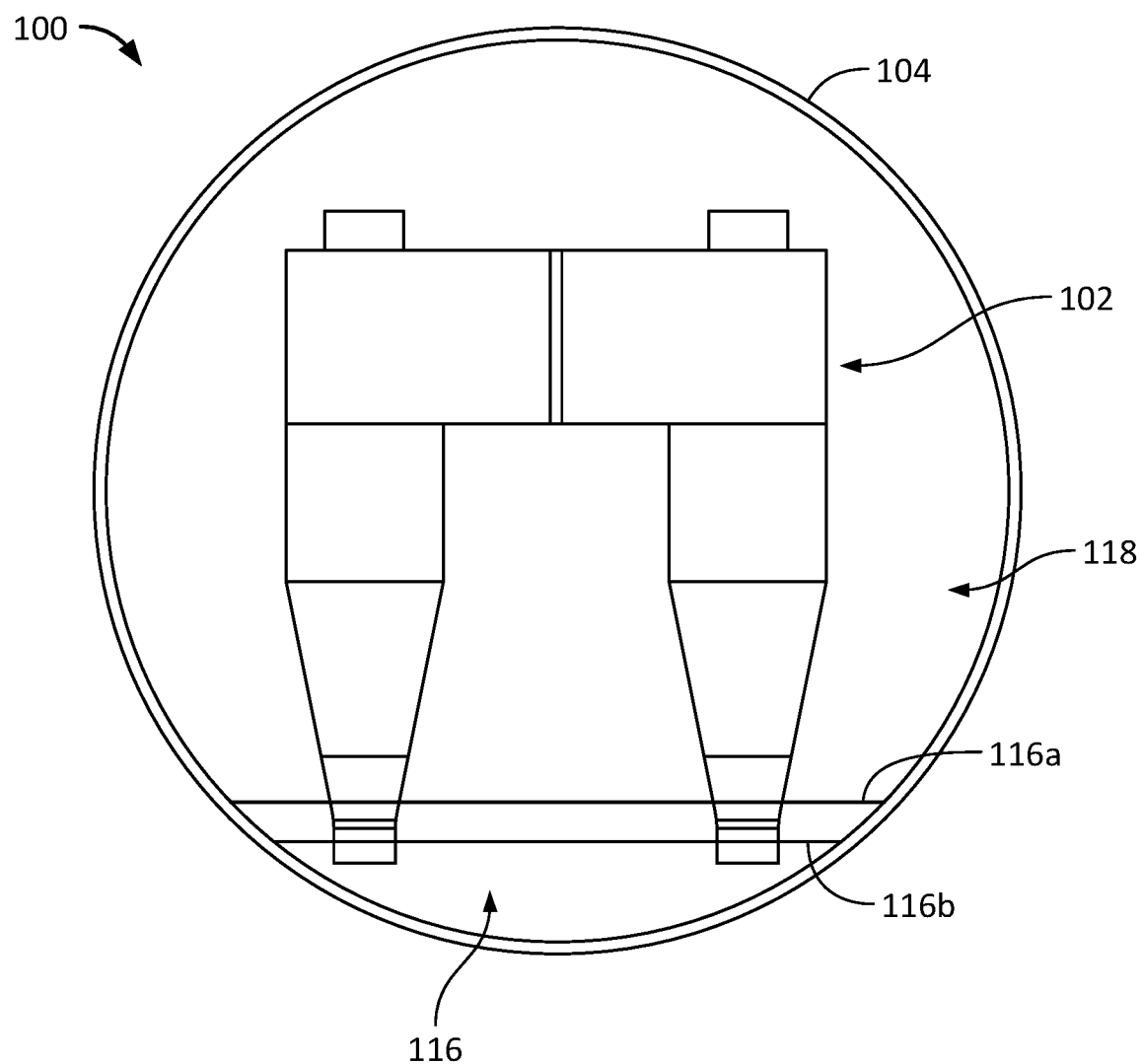
FIG. 2 is a cross-sectional back view of the separator system.

FIG. 2 is a cross-sectional back view of the separator system 100. The separator apparatus 102 receives a liquid-gas mixture at the inlet nozzle 108 and separates the liquid-gas mixture in the first and second cyclones 106a, 106b. Each cyclone exhausts separated gas out an upper portion (for example, a vortex finder or cylinder) and the separated liquid is discharged out a lower portion (e.g., an underflow portion).

This configuration produces a lower liquid flow 116 with a liquid surface 116a and an upper gas flow 118 in the separator vessel 104. The liquid in the separator system 100 is an oil-water mixture which further separates in the separator vessel 104, forming an oil-water interface 116b below the liquid surface 116a. In some cases, after exiting the separator apparatus 102 the gas flow may entrain some liquid droplets from the liquid surface 116a.

The separator vessel 104 has a diameter $D_{SV}$. The sizing of the first and second cyclones 106a, 106b are based on or proportional to a characteristic ratio is the diameter $D_{SV}$ of the separator vessel 104 to the diameter $D_{IN}$ of the inlet nozzle diameter. The characteristic ratio is used to scale the separator apparatus 102 to fit inside the separator vessel 104.

Figure 3:
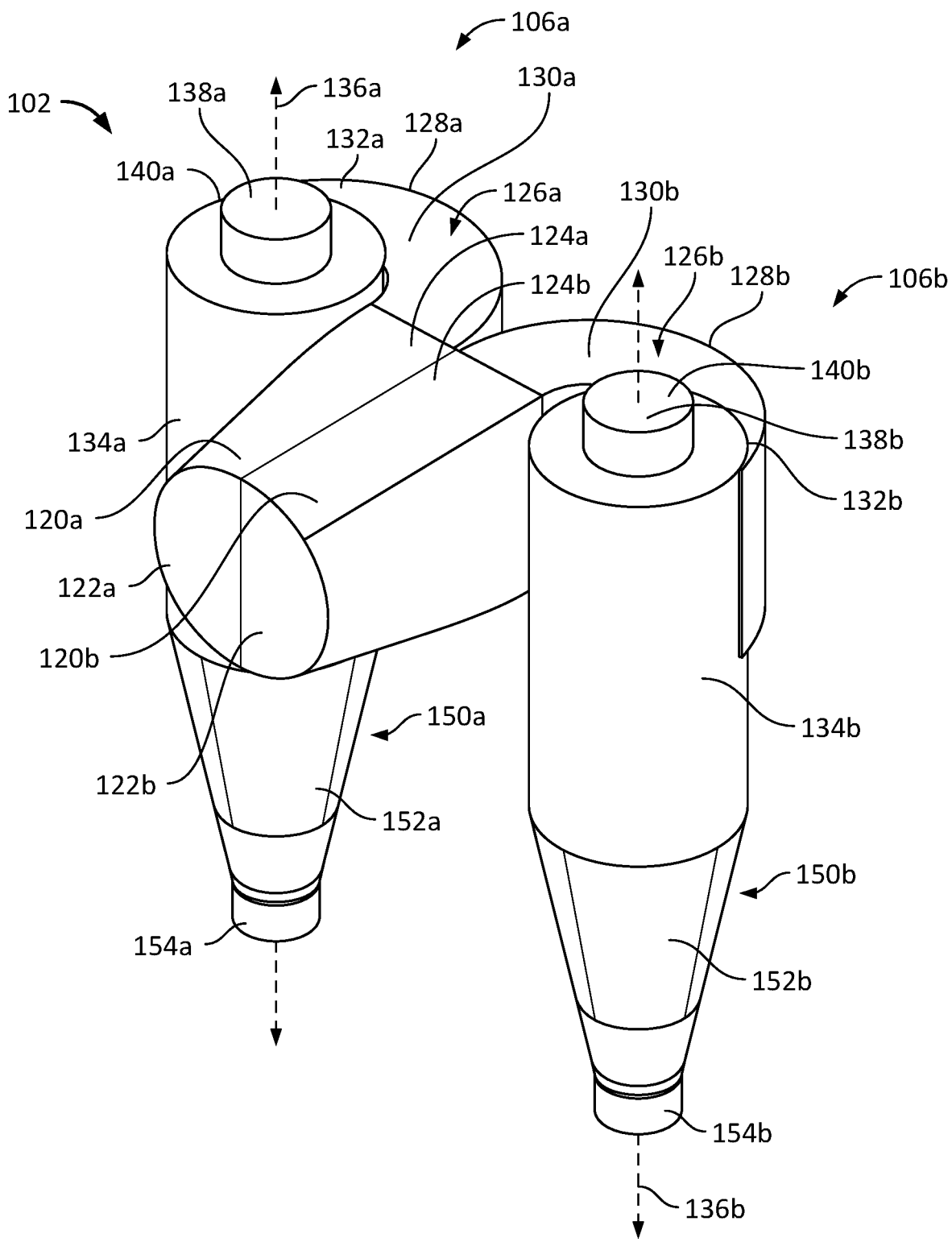
FIG. 3 is a perspective view of the separator apparatus.

FIG. 3 is a perspective view of the separator apparatus 102. The first cyclone device 106a includes a first inlet section 120a having a first end 122a and a second end 124a. The first end 122a is fluidly connected to the inlet nozzle 108. A cross-sectional area of the first inlet section 120a increases from the first end 122a to the second end 124a. This configuration can dampen the incoming flow stream and reduce the velocity of the fluid mixture. The first end 122a has a generally half circle (semi-circle) cross sectional shape and the second end 124a has a generally rectangular cross sectional shape.

The second cyclone device 106b includes a second inlet section 120b having a first end 122b and a second end 124b. The first end 122b is fluidly connected to the inlet nozzle 108. A cross-sectional area of the second inlet section 120b increases from the first end 122b to the second end 124b. This configuration can dampen the incoming slug flow and reduce the velocity of the fluid mixture. The first end 122a has a generally half circle (semi-circle) cross sectional shape and the second end 124a has a generally rectangular cross sectional shape. The first inlet section 120a and second inlet section 120b are described in further detail with reference to FIG. 5.

The first cyclone 106a of the apparatus 102 includes a first scroll 126a comprising a curved member 128a. The first scroll 126a has a first end 130a and a second end 132a. The first end 130a of the first scroll 126a is fluidly connected to the second end 124a of the first inlet section 120a. The first scroll 126a is shaped so that fluid flowing in the first scroll 126a rotates. The second cyclone device 106b includes a second scroll 126b comprising a curved member 128b. The second scroll 126b has a first end 130b and a second end 132b. The first end 130b of the second scroll 126b is fluidly connected to the second end 124b of the second inlet section 120b. The second scroll 126b is shaped so that fluid flowing in the second scroll 126b rotates. The first scroll 126b and second scroll 126b are described in further detail with reference to FIG. 6.

A first barrel 134a of the separators apparatus 102 fluidly connects to the second end 132a of the first scroll 126a. The first barrel 134a is centered on a first axis 136a. The first barrel 134a is configured to continue to rotate the fluid mixture so that the fluid mixture separates. In the second cyclone device 106b, a second barrel 134b of the separators apparatus 102 fluidly connects to the second end 132b of the second scroll 126b. The second barrel 134b is centered on a second axis 136b. The second axis 136b is parallel to the first axis 136a. The second barrel 134b is configured to continue to rotate the fluid mixture so that the fluid mixture separates. The first barrel 134a and second barrel 134b are described in further detail with reference to FIG. 7.

The first cyclone device 106a also has a first vortex finder 138a with a tube 140a. The tube 140a is arranged concentrically in the first barrel 134a, on the first axis 136a. The first vortex finder 138a is configured to guide and exhaust the separated gas from the first barrel 134a. The second cyclone device 106b also has a second vortex finder 138b with a tube 140b. The tube 140b is arranged concentrically in the second barrel 134b, on the second axis 136b. The second vortex finder 138b is configured to guide and exhaust the separated gas from the second barrel 134b. The first vortex finder 138a and second vortex finder 138b are described in further detail with reference to FIG. 8.

The first cyclone device 106a includes a first underflow portion 150a. The first underflow portion 150a includes a first conical member 152a and a first underflow body 154a. The first underflow portion 150a is fluidly connected to the first barrel 134a such that the separated liquid from the fluid mixture flows through the first underflow portion 150a. The second cyclone device 106b includes a second underflow portion 150b. The second underflow portion 150b includes a second conical member 152b and a second underflow body 154b. The second underflow portion 150b is fluidly connected to the second barrel 134b such that the separated liquid from the fluid mixture flows through the second underflow portion 150b. The first underflow portion 150a and second underflow portion 150b are described in further detail with reference to FIGS. 8-11.

Figure 4:
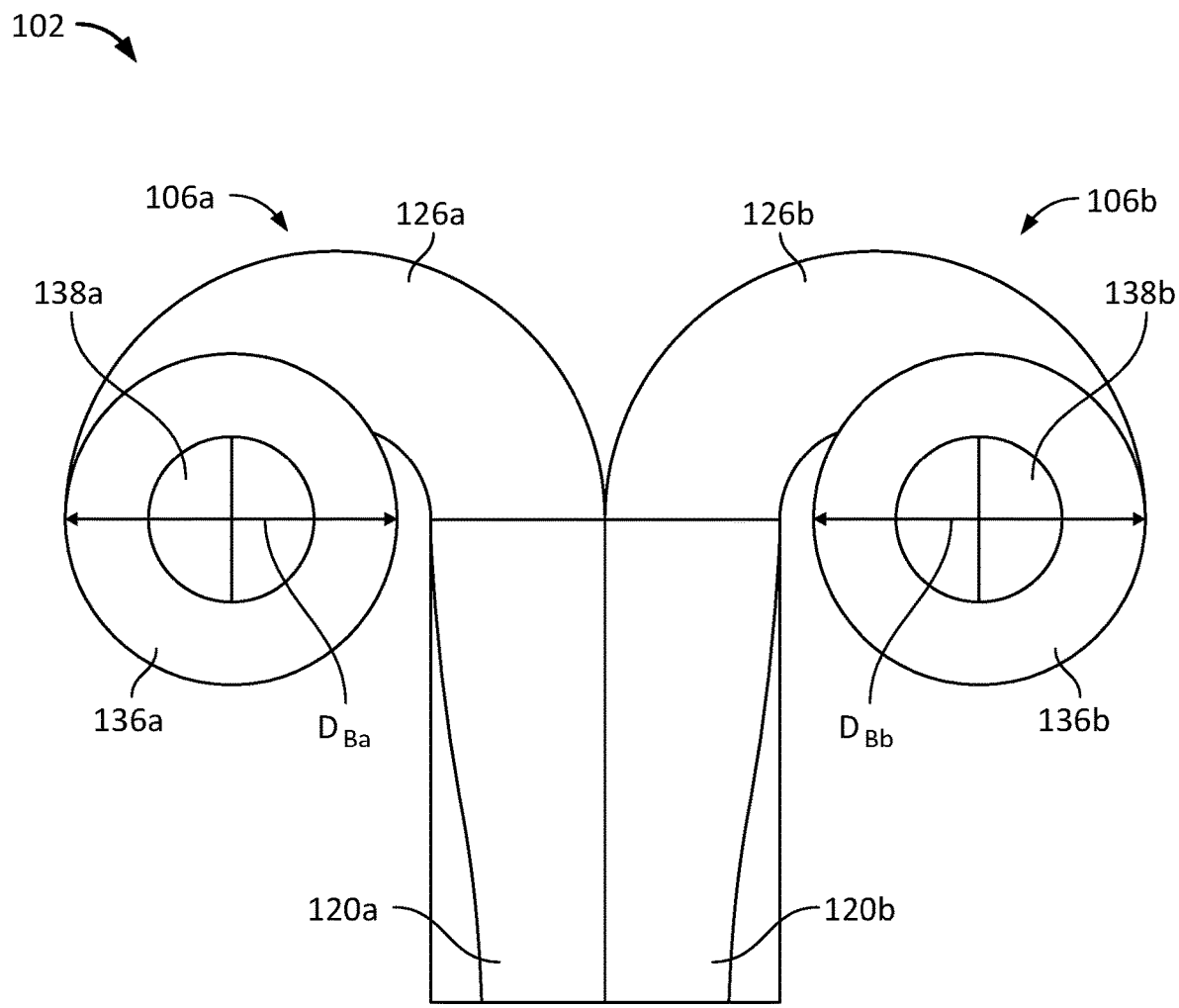
FIG. 4 is a top view of the separator apparatus.

FIG. 4 is a top view of the separator apparatus 102. The first barrel 134a has a first barrel diameter $D_{Ba}$. The diameter $D_{Ba}$ is calculated, in part, by the characteristic ratio ($D_{SV}/D_{IN}$). Some characteristic ratios are equal to or below 6 (e.g., between 0.5 and 6, between 1 and 6, between 2 and 6, between 3 and 6, between 4 and 6, between 5 and 6, between 2 and 5, between 3 and 4, 0.5, 1, 1.5, 2, 2.5, 3, 3.5, 4, 4.5, 5, 5.5, or 6). Some characteristic ratios are larger than 6. Other scaling ratios may also be used to calculate diameter $D_{Ba}$, for example, a ratio of the diameter of the actual separator vessel to the diameter of a reference separator vessel may be used with the characteristic ratio to calculate the diameter $D_{Ba}$. In some cases, a scaling factor (e.g., between 0.2 and 0.5, or about 0.35) can be used with the characteristic ratio and/or the scaling ratio to calculate diameter $D_{Ba}$.

The second barrel 134b has a second barrel diameter $D_{Bb}$. The diameter $D_{Bb}$ is calculated, in part, by the characteristic ratio ($D_{SV}/D_{IN}$). Some characteristic ratios are equal to or below 6 (e.g., between 0.5 and 6, between 1 and 6, between 2 and 6, between 3 and 6, between 4 and 6, between 5 and 6, between 2 and 5, between 3 and 4, 0.5, 1, 1.5, 2, 2.5, 3, 3.5, 4, 4.5, 5, 5.5, or 6). Some characteristic ratios are larger than 6. Other scaling ratios may also be used to calculate diameter $D_{Bb}$, for example, a ratio of the diameter of the actual separator vessel to the diameter of a reference separator vessel may be used with the characteristic ratio to calculate the diameter $D_{Bb}$. In some cases, a scaling factor (e.g., between 0.2 and 0.5, or about 0.35) can be used with the characteristic ratio and/or the scaling ratio to calculate diameter $D_{Bb}$.

In the separator apparatus 102, the first barrel diameter $D_{Ba}$ and second barrel diameter $D_{Bb}$ are equal. In some systems, the first barrel diameter $D_{Ba}$ is greater than the second barrel diameter $D_{Bb}$. In some systems, the first barrel diameter $D_{Ba}$ is less than the second barrel diameter $D_{Bb}$. The dimensions of the separator apparatus 102 and separator vessel 104 are related to a characteristic dimension. The characteristic dimension is the first barrel diameter $D_{Ba}$.

Figure 5:
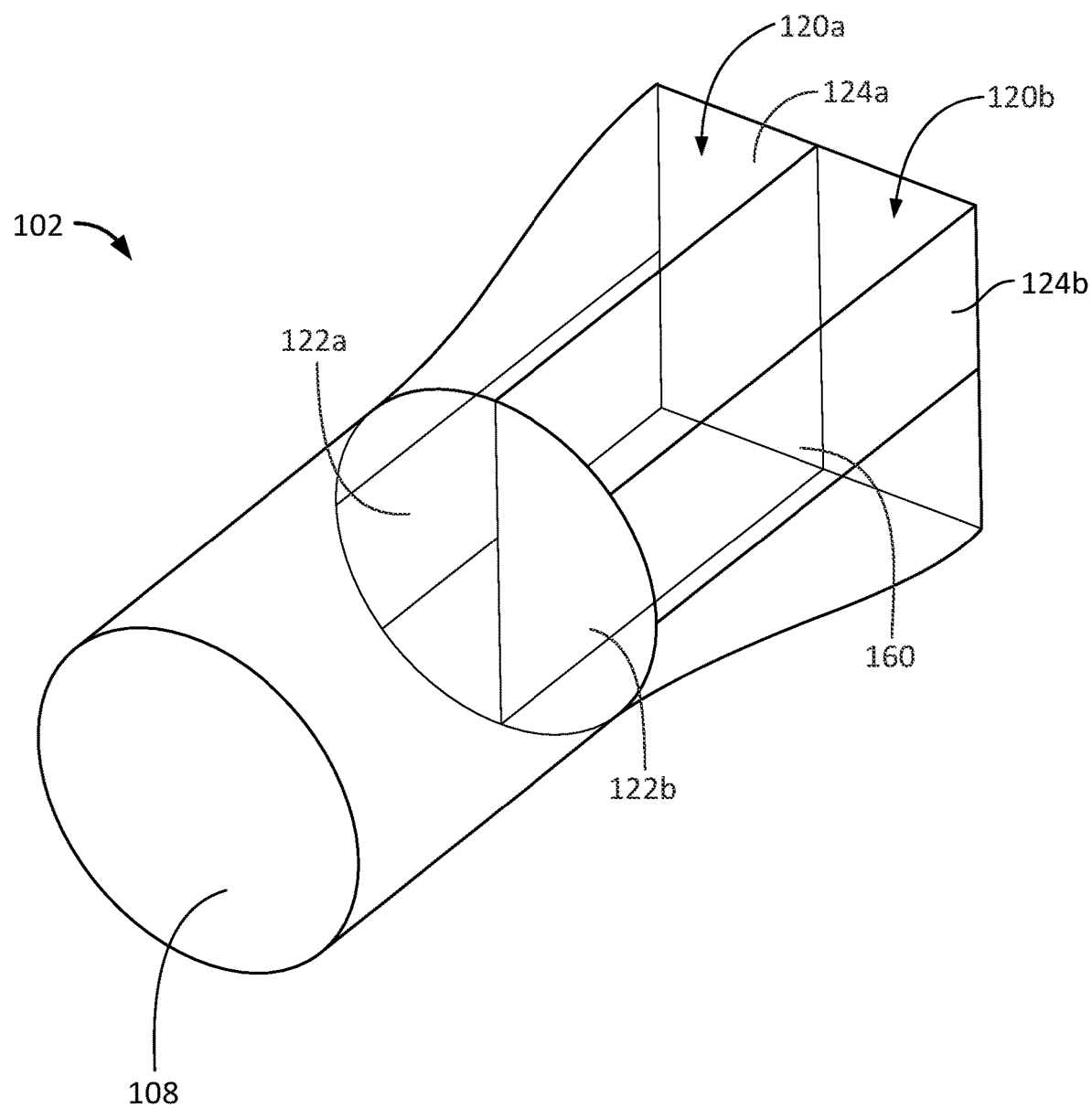
FIG. 5 is a perspective view of the inlet nozzle and first and second inlet sections of the separator apparatus.

FIG. 5 is a perspective view of the inlet nozzle 108 and first and second inlet sections 120a, 120b of the separator apparatus 120. The separator apparatus 102 includes a divider plate 160 that diverts the fluid mixture received from the inlet nozzle 108 into the first inlet section 120a and the second inlet section 120b. The fluid is divided evenly. In some cases, a portion of fluid diverted to the first inlet section 120a is less than the portion of fluid diverted to the second inlet portion 120b. In some cases, a portion of fluid diverted to the first inlet section 120a is greater than the portion of fluid diverted to the second inlet portion 120b. The inlet nozzle 108 has a circular cross section. The first end 122a of the first inlet section 120a has a hemispherical cross section and the first end 122b of the second inlet section 120b has a hemispherical cross section. Together, the first inlet section 120a and second inlet section 120b align with the circular cross section of the nozzle 108.

The first end 130a of the first scroll 126a has a rectangular cross section. The second end 124a of the first inlet section 120a has a rectangular cross section dimensioned to match the first end 130a of the first scroll 126a. The second end 124a of the first inlet section 120a has a larger cross sectional area than the first end 122a of the first inlet section 120a. The first end 130b of the second scroll 126b has a rectangular cross section. The second end 124b of the second inlet section 120b has a rectangular cross section dimensioned to match the first end 130b of the second scroll 126b. The second end 124b of the second inlet section 120b has a larger cross sectional area than the first end 122b of the second inlet section 120b. As the cross sectional area is taken from the first end 122a of the first inlet section 120a to the second end 124a of the first inlet section 120a, the cross sectional area gradually increases. This configuration can reduce flow separation, turbulence, and shearing forces. As the cross sectional area is taken from the first end 122b of the second inlet section 120b to the second end 124b of the second inlet section 120a, the cross sectional area gradually increases. This configuration can reduce flow separation, turbulence, and shearing forces. This configuration can also reduce the momentum of the fluid mixture, for example by about 38%.

The cross sectional areas of the first and second inlet sections 120a, 120b may transition from a hemispherical cross section at the first end 122a, 122b to a rectangular cross section at the second end 124a, 124b close to the first end 122, 122b so that a majority of the first and second inlet sections 120a, 120b have a rectangular cross section. A height of the rectangular cross-section of the first inlet section and/or second inlet section may be equal to a diameter of the inlet nozzle. A width of the rectangular cross-section of the first inlet section and/or second inlet section may be equal to a radius of the inlet nozzle.

While the inlet nozzle 108 has been shown as a horizontally, some inlet nozzles are arranged vertically. A vertical nozzle may include an elbow or bend to guide the fluid to the inlet sections of the separator apparatus.

Figure 6:
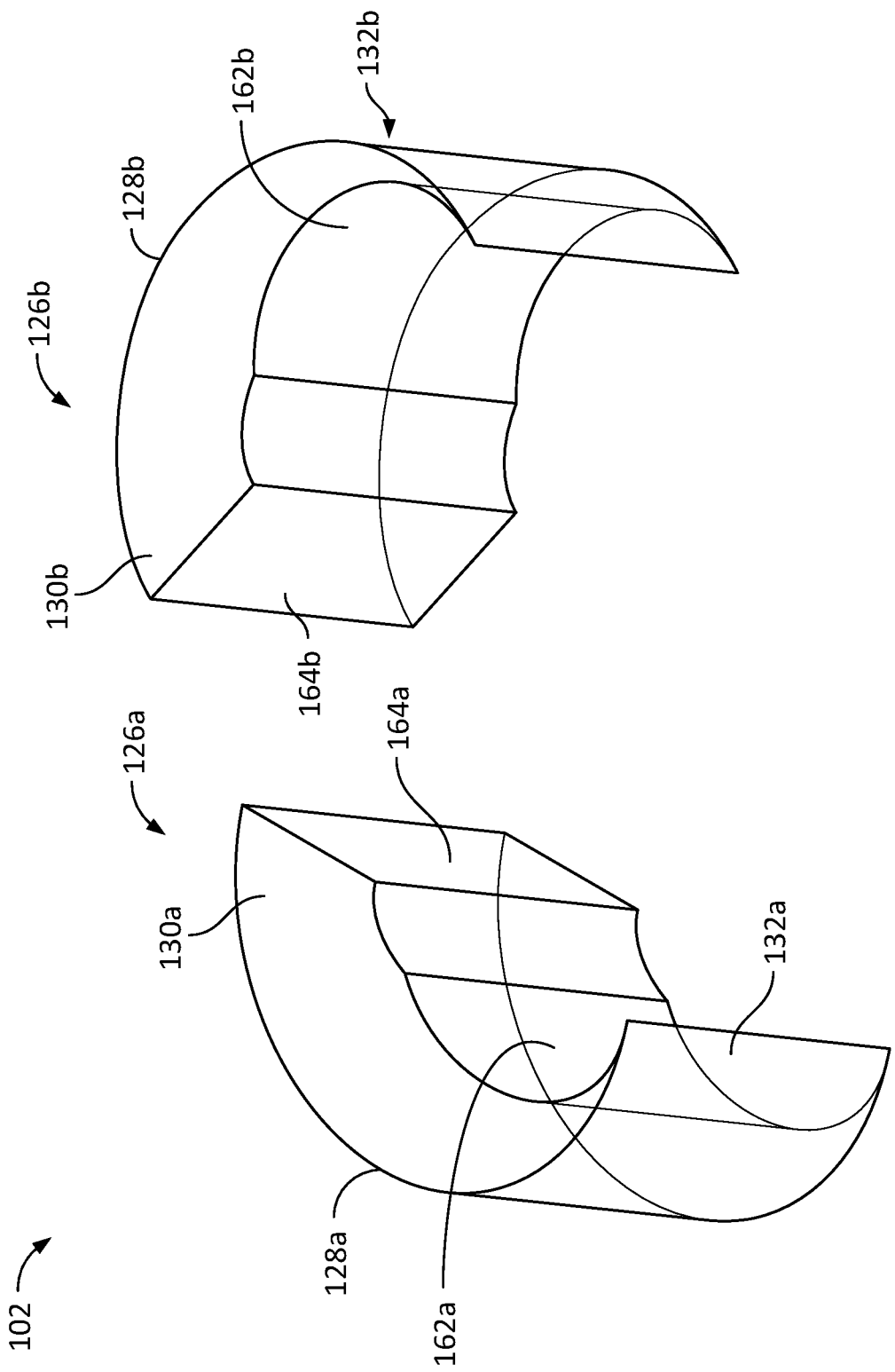
FIG. 6 is a perspective view of a first scroll and a second scroll of the separator apparatus.

FIG. 6 is a perspective view of the first scroll 126a and the second scroll 126b of the separator apparatus 102. The first scroll 126a includes the first curved member 128a. The first curved 128a member is a circular ramp (arc) and is arranged tangent to the first barrel 138a. The first scroll 126a receives the fluid mixture from the second end 124a of the first inlet section 120a and guides the fluid mixture to curve, or rotate about the first axis 136a. The first scroll 126a introduces the flow tangentially at the periphery of the first barrel 170a, avoiding direct impact of liquid droplets onto the first vortex finder 138a and reducing the shearing of the droplets (i.e. shattering of the droplets into smaller ones). The fluid mixture is discharged into the first barrel 134a at an outlet 162a at the second end 132a of the first scroll 126a. The fluid mixture is received at an inlet 164a at the first end 130a of the first scroll 126a. The outlet 162a has a cross sectional area that is larger than the cross sectional area of the inlet 164a of the first scroll 126a. The tangent-circle inlet can reduce liquid droplets from directly impacting the first vortex finder 138a which may reduce shearing of the droplets (i.e. shattering them into smaller droplets) and the stability of the emulsion. The tangent-circle inlet can also reduce erosion effects on an outer surface of the first vortex finder 138a.

The second scroll 126b includes the second curved member 128b. The second curved member may be a circular ramp. The second curved 128b member is a circular ramp (arc) and is arranged tangent to the second barrel 138. The second scroll 126b receives the fluid mixture from the second end 124b of the second inlet section 120b and guides the fluid mixture to curve, or rotate about the second axis 136b. The second scroll 126b introduces the flow tangentially at the periphery of the second barrel 170b, avoiding direct impact of liquid droplets onto the second vortex finder 138b and reducing the shearing of the droplets (i.e. shattering of the droplets into smaller ones). The fluid mixture is discharged into the second barrel 134b at an outlet 162b at the second end 132b of the second scroll 126b. The fluid mixture is received at an inlet 164b at the first end 130b of the second scroll 126b. The outlet 162b has a cross sectional area that is larger than the cross sectional area of the inlet 164b of the second scroll 126b. The tangent-circle inlet can reduce liquid droplets from directly impacting the second vortex finder 138b which may reduce shearing of the droplets (i.e. shattering them into smaller droplets) and the stability of the emulsion. The tangent-circle inlet can also reduce erosion effects on an outer surface of the second vortex finder 138b.

Figure 7:
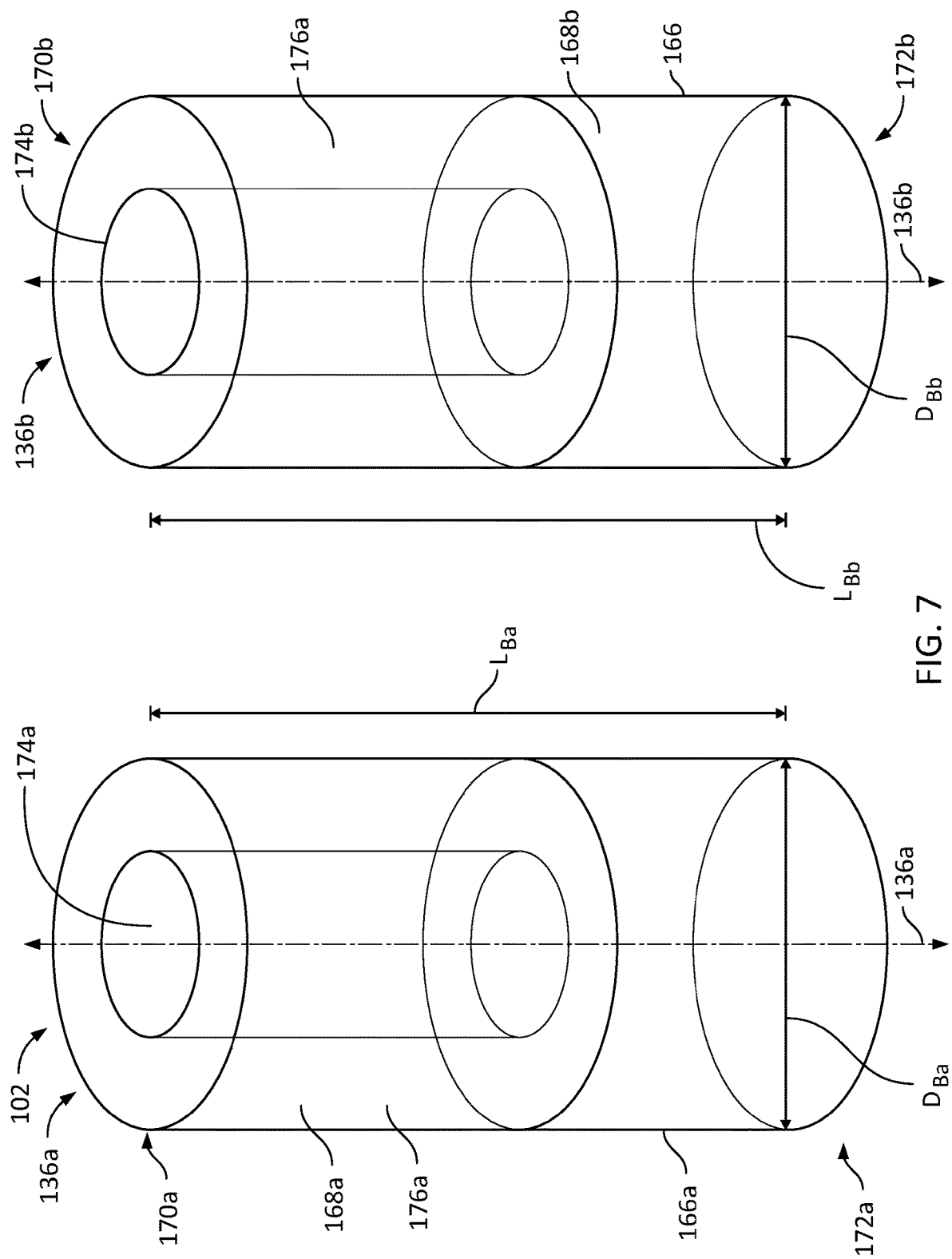
FIG. 7 is a perspective view of a first barrel and a second barrel of the separator apparatus.

FIG. 7 is a perspective view of the first barrel 134a and the second barrel 134b of the separator apparatus 102. The first barrel 134a has a cylindrical outer wall 166a that defines an interior volume 168a. The first barrel 134a has an upper (first) end 170a and a lower (second) end 172a. An inner cylinder 174a of the first barrel 134a is arranged concentrically on the first axis 136a. A feed chamber 176a is defined by the outer walls 166a and the inner cylinder 174a. In some cases, the inner cylinder is the first vortex finder. The interior volume 168a receives the fluid mixture, rotating about the first axis 136a, from the outlet 162a of the first scroll 126a. The tangentially incoming mixture stream continues its swirling action/motion creating an outer vortex moving downward, towards the lower end 172a of the first barrel 134a, thereby generating a centrifugal force that pushed the heavier or denser fluids (e.g., liquids) towards the outer walls 166a of the first barrel 134a. The swirling action generates a low-pressure, inner vortex at the center, on the first axis 136a. The low pressure, inner vortex, moves upward where the lighter, less dense fluid (e.g., gas) migrates. The lower end 172a of the first barrel 134a increases a residence time, increases a capacity of the first barrel 134a, and reduces the tangential velocity of the fluid. An increased residence time can increase the separation of liquid and gas from the liquid-gas mixture.

The second barrel 134b has a cylindrical outer wall 166b that defines an interior volume 168b. The second barrel 134b has an upper (first) end 170b and a lower (second) end 172b. An inner cylinder 174b of the second barrel 134b is arranged concentrically on the second axis 136b. A feed chamber 176b is defined by the outer walls 166b and the inner cylinder 174b. In some cases, the inner cylinder is the second vortex finder. The interior volume 168b receives the fluid mixture, rotating about the second axis 136b, from the outlet 162b of the second scroll 126b. The tangentially incoming mixture stream continues a swirling action/motion creating an outer vortex moving downward, towards the lower end 172b of the second barrel 134b, thereby generating a centrifugal force that pushed the heavier or denser fluids (e.g., liquids) towards the outer walls 166b of the second barrel 134b. The swirling action generates a low-pressure, inner vortex at the center, on the second axis 136b. The low pressure, inner vortex, moves upward where the lighter, less dense fluid (e.g., gas) migrates. The lower end 172b of the second barrel 134b increases a residence time, increases a capacity of the second barrel 134b, and reduces the tangential velocity of the fluid. An increased residence time can increase the separation of liquid and gas from the liquid-gas mixture.

The first barrel 134a has a first barrel length $L_{Ba}$. The second barrel 134b has a second barrel length $L_{Bb}$ (FIG. 7). The first barrel length $L_{Ba}$ and second barrel length $L_{Bb}$ are equal. In some systems, the first barrel length $L_{Ba}$ is greater than the second barrel length $L_{Bb}$. In some systems, the first barrel length $L_{Ba}$ is less than the second barrel length $L_{Bb}$.

The first barrel length $L_{Ba}$ is about 1 to about 1.5 times (e.g., about 1.1 to about 1.3 times) the first barrel diameter $D_{Ba}$. In some cases, first barrel length $L_{Ba}$ is about 0.5, 0.6, 0.7, 0.8, 0.9, 1.0, 1.1, 1.3, 1.4, 1.5, 1.6, 1.7, 1.8, 1.9, or 2.0 times the first barrel diameter $D_{Ba}$. The second barrel length $L_{Bb}$ is about 1 to about 1.5 times (e.g., about 1.1 to about 1.3 times) the second barrel diameter $D_{Bb}$. In some cases, second barrel length $L_{Bb}$ is about 0.5, 0.6, 0.7, 0.8, 0.9, 1.0, 1.1, 1.3, 1.4, 1.5, 1.6, 1.7, 1.8, 1.9, or 2.0 times the second barrel diameter $D_{Bb}$.

Figure 8:
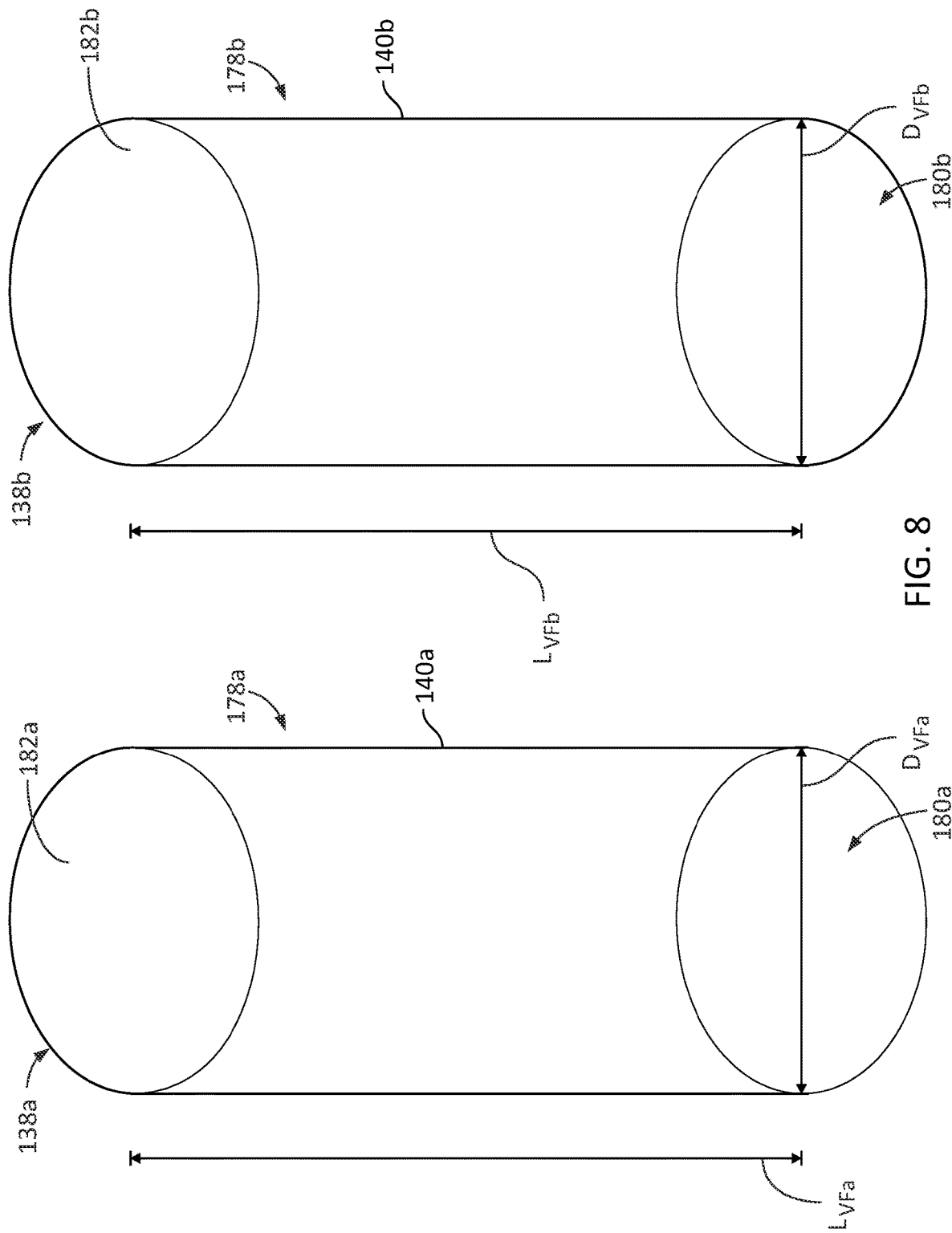
FIG. 8 is a perspective view of a first vortex finder and a second vortex finder of the separator apparatus.

FIG. 8 is a perspective view of a first vortex finder 138a and a second vortex finder 138b of the separator apparatus 102. The first vortex finder 138a is at least partially arranged in the upper end 170a of the first barrel 134a, on the first axis 136a. The first vortex finder 138a includes a cylinder 178a that has an inlet (first) end 180a and a discharge (second) end 182a. The inlet end 180a is arranged in the upper end 170a of the first barrel 134a. The inlet end 180a is arranged so that the outlet 162a of the first scroll 126a is above the inlet end 180a of the cylinder 178a (e.g., closer to the upper end 170a of the first barrel 134a). The inlet end 180a is configured to receive the separated gas (or less dense fluid) in the inner vortex. The cylinder 178a extends from through upper end 170a of the barrel 134a so that the discharge end 182a is arranged outside, or external to the first barrel 134a. The discharge end 182a is configured to discharge the separated gas into the separator vessel 104. The cylinder 178a is sized so that the inner cylinder 174a receives the cylinder 178a of the first vortex finder 138a. In use, the cylinder 178a separates the inner (gas or lighter fluid) vortex from the outer (liquid or dense fluid) vortex. This configuration can prevent large pressure drops.

The second vortex finder 138b is at least partially arranged in the upper end 170b of the second barrel 134b, on the second axis 136b. The second vortex finder 138b includes a cylinder 178b that has an inlet (first) end 180b and a discharge (second) end 182b. The inlet end 180b is arranged in the upper end 170b of the second barrel 134b. The inlet end 180b is arranged so that the outlet 162b of the second scroll 126b is above the inlet end 180b of the cylinder 178b (e.g., closer to the upper end 170b of the first barrel 134a). The inlet end 180b is configured to receive the separated gas (or less dense fluid) in the inner vortex. The cylinder 178b extends from through upper end 170b of the second barrel 134b so that the discharge end 182b is arranged outside, or external to the second barrel 134b. The discharge end 182b is configured to discharge the separated gas into the separator vessel 104. The cylinder 178b is sized so that the inner cylinder 174b of the second barrel 134b receives the cylinder 178b of the second vortex finder 138b. In use, the cylinder 178b separates the inner (gas or lighter fluid) vortex from the outer (liquid or dense fluid) vortex. This configuration can prevent large pressure drops.

The diameters and cross sectional areas of the first and second vortex finders 138a, 138b are determined based on the ratios of gas and liquid volume flows to the total volume flow of the incoming fluid mixture.

The first vortex finder 138a has a first vortex finder length $L_{VFa}$. The first barrel length $L_{Ba}$ and first vortex finder length $L_{VFa}$ are equal. In some systems, the first barrel length $L_{Ba}$ is greater than the first vortex finder length $L_{VFa}$. In some systems, the first barrel length $L_{Ba}$ is less than the first vortex finder length $L_{VFa}$. The second vortex finder 138b has a second vortex finder length $L_{VFb}$. The second barrel length $L_{Bb}$ and second vortex finder length $L_{VFb}$ are equal. In some systems, the second barrel length $L_{Bb}$ is greater than the second vortex finder length $L_{VFb}$. In some systems, the second barrel length $L_{Bb}$ is less than the second vortex finder length $L_{VFb}$.

The first vortex finder length $L_{VFa}$ is about 1 to about 1.5 times (e.g., about 1.1 to about 1.3 times) the first barrel diameter $D_{Ba}$. In some cases, first vortex finder length $L_{VFa}$ is about 0.5, 0.6, 0.7, 0.8, 0.9, 1.0, 1.1, 1.3, 1.4, 1.5, 1.6, 1.7, 1.8, 1.9, or 2.0 times the first barrel diameter $D_{Ba}$. The second vortex finder length $L_{VFb}$ is about 1 to about 1.5 times (e.g., about 1.1 to about 1.3 times) the second barrel diameter $D_{Bb}$. In some cases, second vortex finder length $L_{VFb}$ is about 0.5, 0.6, 0.7, 0.8, 0.9, 1.0, 1.1, 1.3, 1.4, 1.5, 1.6, 1.7, 1.8, 1.9, or 2.0 times the second barrel diameter $D_{Bb}$.

Figure 9:
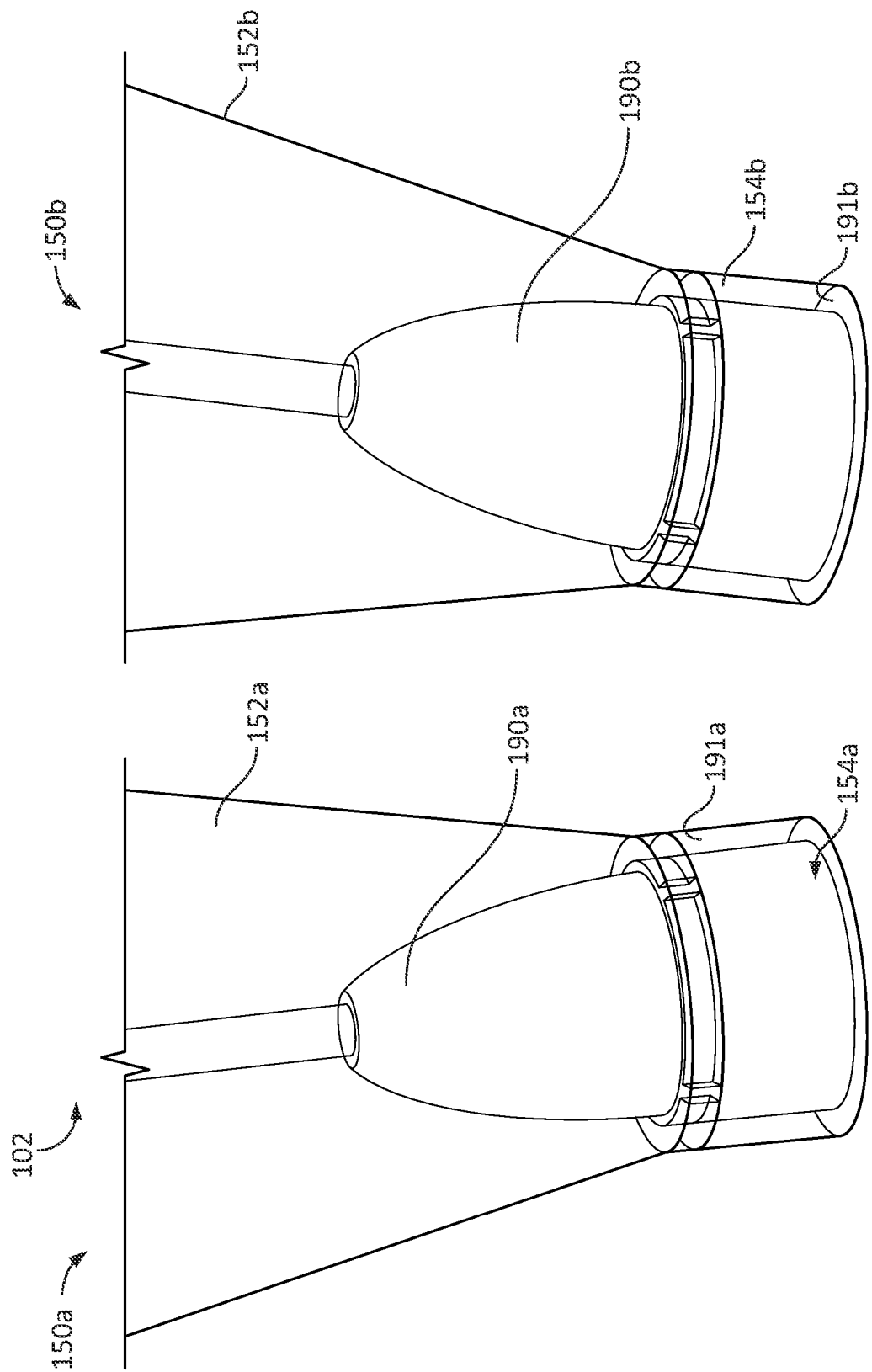
FIG. 9 is a perspective view of a first underflow portion and a second underflow portion of the separator apparatus.

FIG. 9 is a perspective view of a first underflow portion 150a and a second underflow portion 150b of the separator apparatus 102. The first underflow portion 150a includes the first conical member 152a, the first underflow body (cylinder) 154a, and a first insert 190a. The first underflow portion 150a is configured to define a first annular gap, described with further reference to FIG. 12. The second underflow portion 150b includes the second conical member 152b, the second underflow body (cylinder) 154b, and a second insert 190b. The second underflow portion 150b is configured to define a second annular gap, described with further reference to FIG. 12. Cross section areas of the first and second underflow portions may be determined or calculated based on the ratios of gas and liquid volume flows to the total volume flow of the incoming mixture stream.

Figure 10:
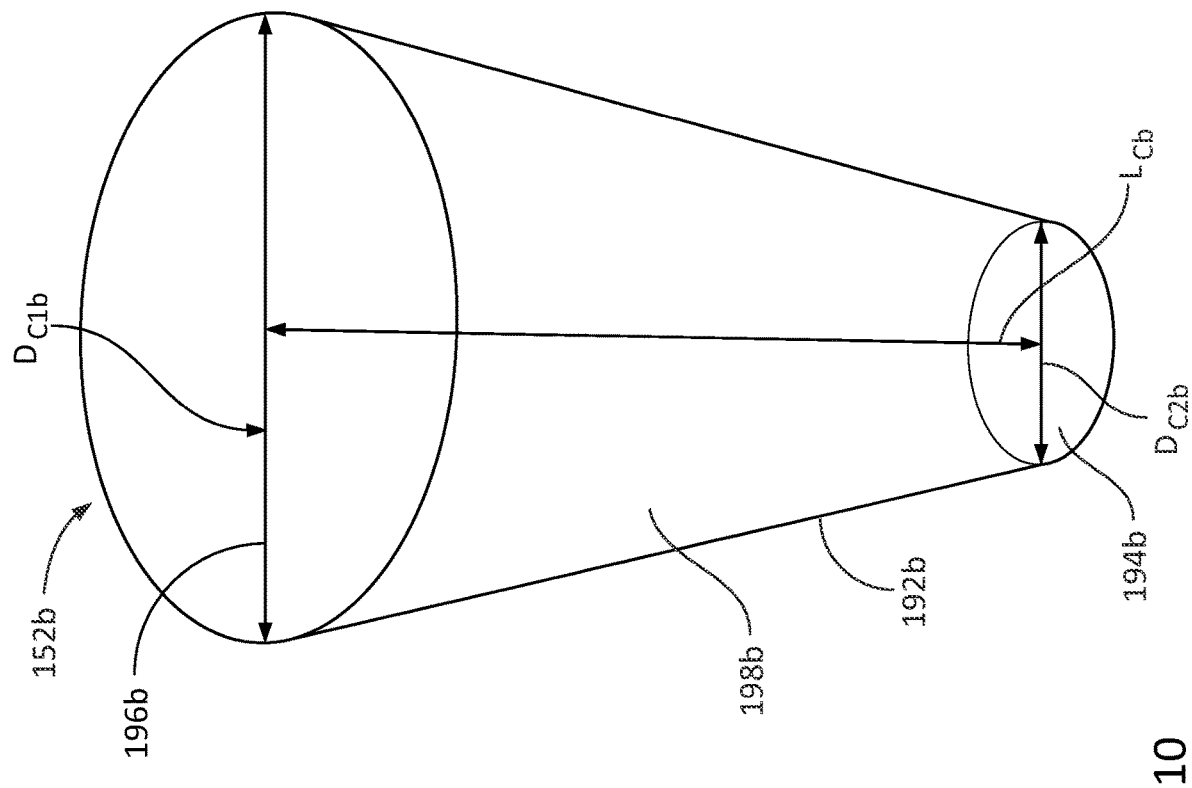
FIG. 10 is a perspective view of a first conical member of the first underflow portion and a second conical member of the second underflow portion.
Figure 10:
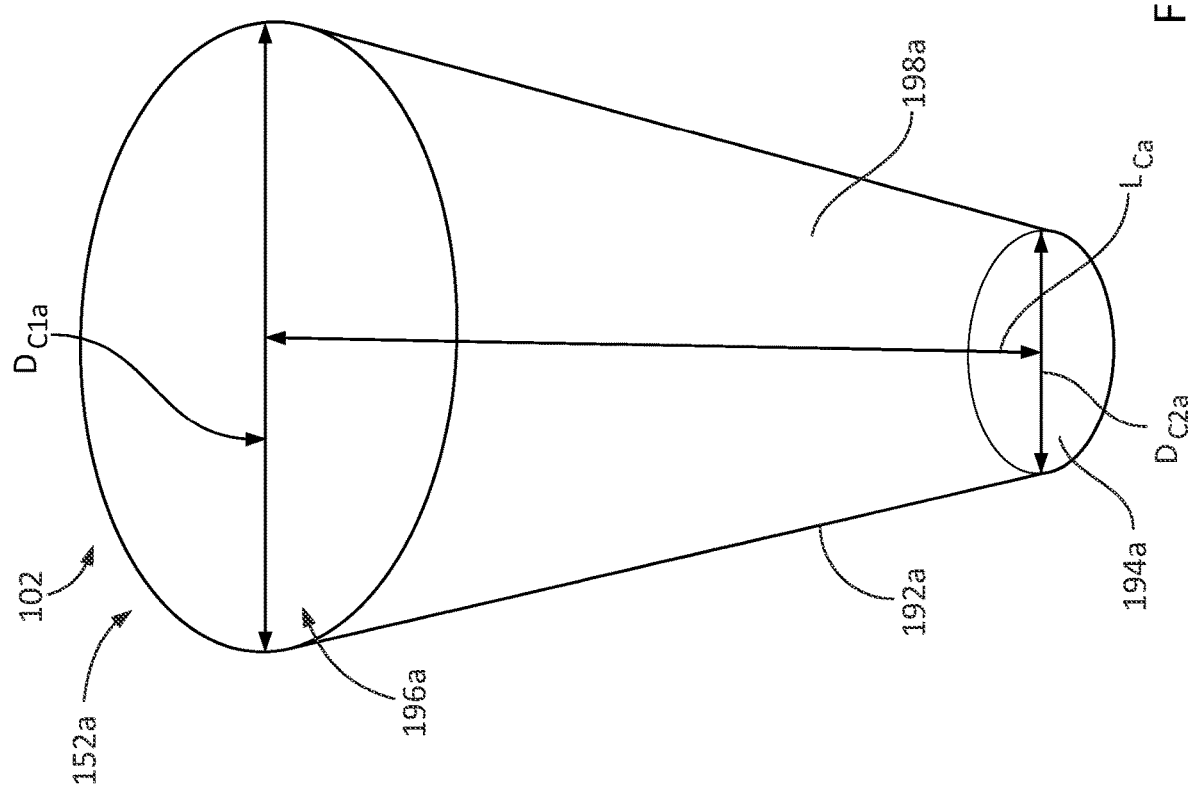

FIG. 10 is a perspective view of a first conical member 152a of the first underflow portion 150a and a second conical member 152b of the second underflow portion 150b. The first conical member 152a includes a first cone 192a or tapered body, with an open first end 194a and an open second end 196a. In some cases the first conical member is convexly shaped or parabolically shaped. The open first end 194a has a diameter $D_{C1a}$. The second open end 196a has a diameter $D_{C2a}$. The diameter $D_{C2a}$ of the second end 196a is equal to the first barrel diameter $D_{Ba}$. The diameter $D_{C2a}$ of the second end 196a greater than the diameter $D_{C1a}$ of the first end 194a. The first cone 192a defines an interior space 198a that is in fluid connection with the interior volume 168a of the first barrel 134a. The first cone 192a is configured to flow the rotating outer vortex of dense fluid (liquids) as the separated dense fluids move downward, away from the first barrel 134a under the force of gravity.

The second conical member 152b includes a second cone 192b or tapered body, with an open first end 194b and an open second end 196b. In some cases the second conical member is convexly shaped or parabolically shaped. The open first end 194b has a diameter $D_{C1b}$. The second open end 196b has a diameter $D_{C2b}$. The diameter Dub of the second end 196b is equal to the second barrel diameter $D_{Bb}$. The diameter $D_{C2b}$ of the second end 196b greater than the diameter $D_{C1b}$ of the first end 194b. The second cone 192b defines an interior space 198b that is in fluid connection with the interior volume 168b of the second barrel 134b. The second cone 192b is configured to flow the rotating outer vortex of dense fluid (liquid) as the separated dense fluid moves downward, away from the second barrel 134b under the force of gravity.

The first and second conical members may increase retention time, at least partially generate (or maintain) the inner vortex, and reduce the tangential flow velocity of the fluid mixture or separated dense fluid. The hyperbolic cone provides an increased swirl motion as well as develops a larger centrifugal force.

The first conical member 152a has a first conical member length $L_{Ca}$. The first barrel length $L_{Ba}$ and first conical member length $L_{Ca}$ are equal. In some systems, the first barrel length $L_{Ba}$ is greater than the first conical member length $L_{Ca}$. In some systems, the first barrel length $L_{Ba}$ is less than the first conical member length $L_{Ca}$. The second conical member 152b has a second conical member length $L_{Cb}$. The second barrel length $L_{Bb}$ and second conical member length $L_{Cb}$ are equal. In some systems, the second barrel length $L_{Bb}$ is greater than the second conical member length $L_{Cb}$. In some systems, the second barrel length $L_{Bb}$ is less than the second conical member length $L_{Cb}$.

The first conical member length $L_{Ca}$ is about 1 to about 1.5 times (e.g., about 1.1 to about 1.3 times) the first barrel diameter $D_{Ba}$. In some cases, first conical member length $L_{Ca}$ is about 0.5, 0.6, 0.7, 0.8, 0.9, 1.0, 1.1, 1.3, 1.4, 1.5, 1.6, 1.7, 1.8, 1.9, or 2.0 times the first barrel diameter $D_{Ba}$. The second conical member length $L_{Cb}$ is about 1 to about 1.5 times (e.g., about 1.1 to about 1.3 times) the second barrel diameter $D_{Bb}$. In some cases, second conical member length $L_{Cb}$ is about 0.5, 0.6, 0.7, 0.8, 0.9, 1.0, 1.1, 1.3, 1.4, 1.5, 1.6, 1.7, 1.8, 1.9, or 2.0 times the second barrel diameter $D_{Bb}$.

Figure 11:
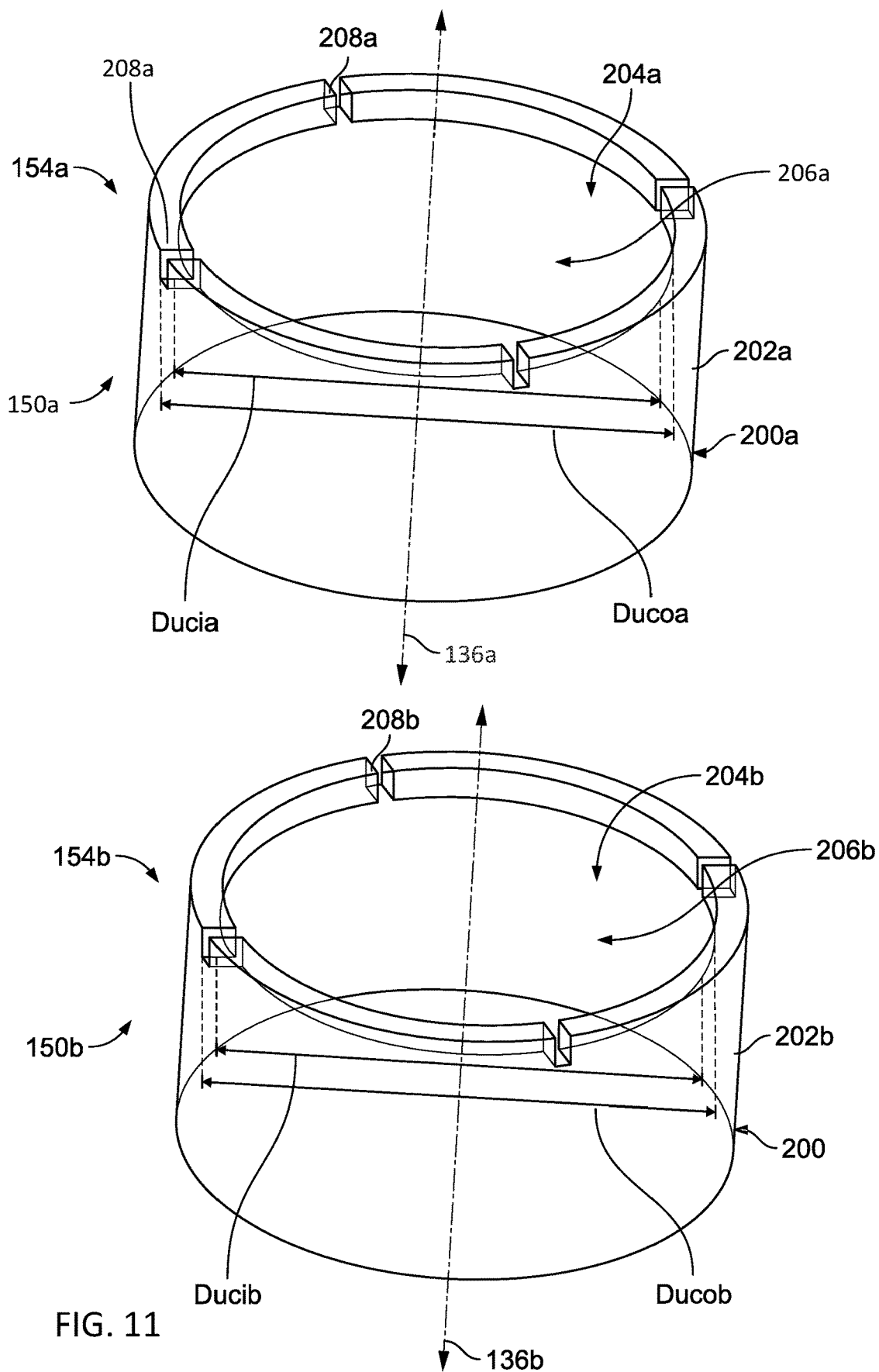
FIG. 11 is a perspective view of a first insert of the first underflow portion and a second insert of the second underflow portion.

FIG. 11 is a perspective view of the first underflow body 154a of the first underflow portion 150a and the second underflow body 154b of the second underflow portion 150b. The first underflow body 154a includes a first inner cylinder 200a having an exterior surface 202a and an interior surface 204a. The exterior surface 202a has a diameter $D_{UCoa}$. The interior surface 204a defines an opening 206a sized to receive the first insert 190a of the first underflow portion 150a.

The diameter $D_{UCoa}$ of the exterior surface 202a of the first underflow body 154a is less than the diameter $D_{C1a}$ of the first end 194a of the cone 192a, such that when assembled, a first annular gap 191a (FIG. 9) is defined. The first annular gap 191a discharges the dense, separated fluid in the outer vortex from the separator apparatus 102, into the separator vessel 104. The first annular gap 191a is sized so that fluid can flow through the annular gap at a low exit velocity (e.g., about 0.01 m/s to about 1.0 m/s).

The second underflow body 154b includes a second inner cylinder 200b having an exterior surface 202b and an interior surface 204b. The exterior surface 202b has a diameter $D_{UCob}$. The interior surface 204b defines an opening 206b sized to receive the second insert 190b of the second underflow portion 150b. The second inner cylinder 200b defines multiple grooves 208a, for example four grooves equidistantly spaced around the cylinder.

The diameter $D_{UCob}$ of the exterior surface 202b of the second underflow body 154b is less than the diameter $D_{C1b}$ of the first end 194b of the cone 192b, such that when assembled, a second annular gap 191b (FIG. 9) is defined. The second annular gap 191b discharges the dense, separated fluid in the outer vortex from the separator apparatus 102, into the separator vessel 104. The second annular gap 191b is sized so that fluid can flow through the annular gap at a low exit velocity (e.g., about 0.01 m/s to about 1.0 m/s).

The cross sectional area of the first and second annular gaps can be calculated or controlled based on the fluid flow rate at the inlet nozzle. The first and second annular gaps in the first and second underflow portions, with the first and second underflow bodies reduce gas blow-by which can also reduce foaming, increase level control, and reduce gas or liquid carryover to downstream vessels.

Figure 12:
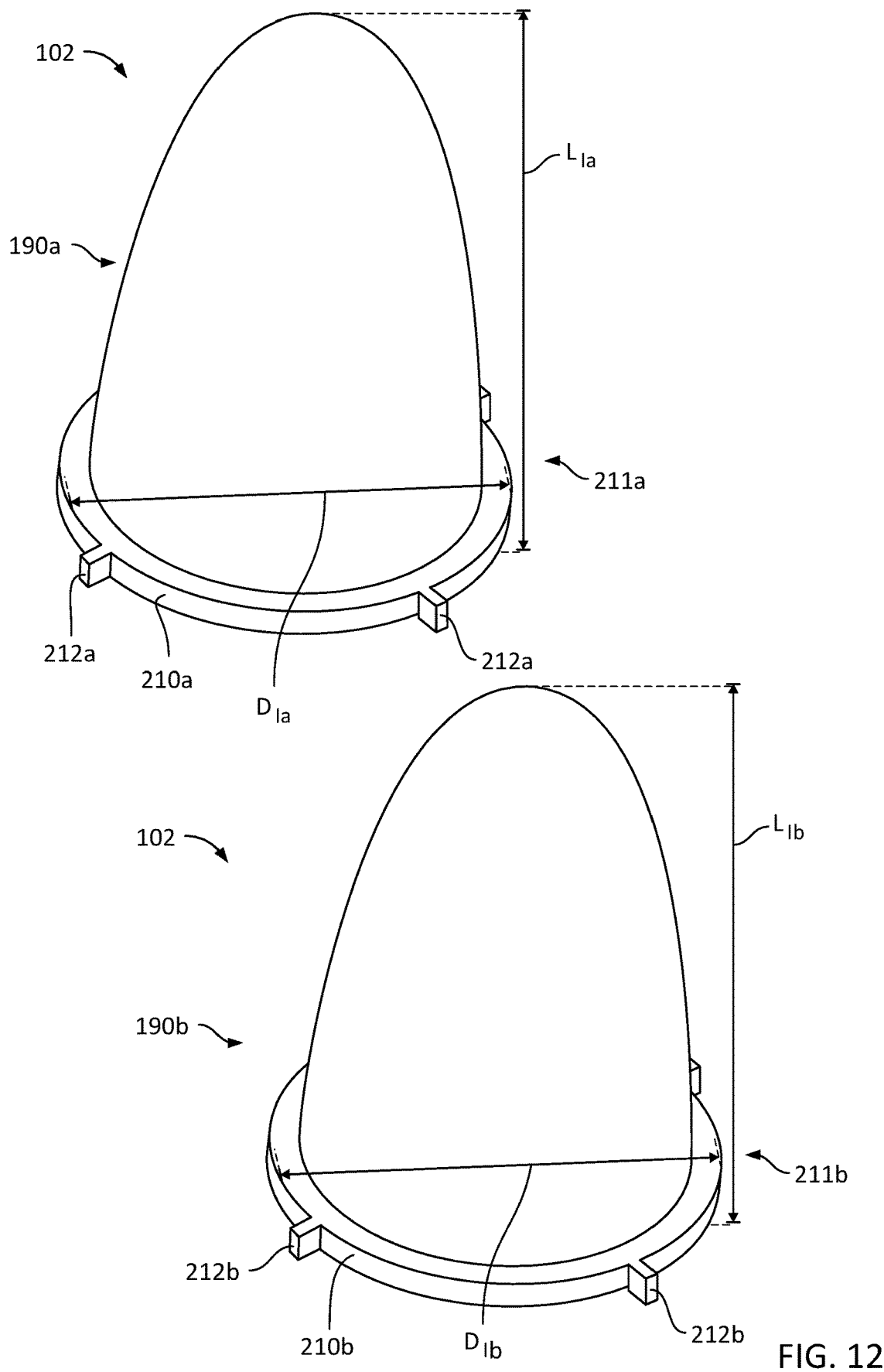
FIG. 12 is a perspective view of a first underflow cylinder of the first underflow portion and a second underflow cylinder of the second underflow portion.

FIG. 12 is a perspective view of the first insert 190a of the first underflow portion 150a and the second insert 190b of the second underflow portion 150b. The first insert 190a includes a base 210a at a first end 211a of the first insert 190a. The base also has a diameter Dia. The diameter of the base $D_{1a}$ is equal to the diameter $D_{UCib}$ of the interior surface 204a of the first inner cylinder 200a. The base 210a includes multiple notches 212a. The grooves 208a in the first inner cylinder 200a of the first underflow body 154a are sized to receive the notches 212a of the first insert 190a to releasably connect the first insert 190a to the first underflow body 154a. In some underflow portions, the insert is welded or mechanically attached to the conical member. When attached, the first insert 190a covers the opening 206a defined by the first inner cylinder 200a. The first insert 190a includes a wall 214a that extends from the base 210a to a second end 216a of the first insert 190a. The wall 214a has a parabolic shape. Some walls have a circular, ellipsoidal, conical, or frustum shape. The diameter $D_{1a}$ of the first insert 190a is about 10% to about 15% of the diameter $D_{UCoa}$ of the exterior surface 202a of the first underflow body 154a.

The second insert 190b includes a second base 210b at a first end 211b of the second insert 190b. The base also has a diameter Dm. The diameter of the base $D_{Ib}$ is equal to the diameter $D_{UCib}$ of the interior surface 204b of the second inner cylinder 200b. The base 210b includes multiple notches 212b. The grooves 208b in the second inner cylinder 200b of the second underflow body 154b are sized to receive the notches 212b of the second insert 190b to releasably connect the second insert 190b to the second underflow body 154b. In some underflow portions, the insert is welded or mechanically attached to the conical member. When attached, the second insert 190b covers the opening 206b defined by the second inner cylinder 200b. The second insert 190b includes a wall 214b that extends from the base 210b to a second end 216b of the second insert 190b. The wall 214b has a parabolic shape. Some walls have a circular, ellipsoidal, conical, or frustum shape. The diameter $D_{IB}$ of the second insert 190b is about 5% to about 20% (e.g., about 10% to about 15%) of the diameter $D_{UCob}$ of the exterior surface 202b of the second underflow body 154b The first and second inserts may, initiate the inner vortex and reduce the possibility of gas leakage via the underflow.

In use, the inlet nozzle 108 receives a fluid mixture, for example, a water-gas mixture. The fluid mixture is equally divided into the first inlet section 120a and the second inlet section 120b.

In the first cyclone device 106a, from the first inlet section 120a, the fluid mixture continues through the first inlet section to the first scroll and exits the scroll outlet 162a into the first barrel 134a. The velocity of the fluid mixture decreases from the first inlet section 120a to the outlet 162a of the first scroll 126a due to the gradual increase in cross sectional area from the first end 122a of the first inlet section 120a to the outlet 162a of the first scroll 126a. The first scroll 126a also guides the fluid mixture to rotate or swirl around the first axis 136a so that the fluid mixture has a swirling pattern when tangentially entering the first barrel 134a. The fluid mixture continues to swirl around the first axis 136a creating an outer vortex moving downward and an inner vortex moving upward. The outer vortex, due to centrifugal forces, includes the heavier, denser liquid (e.g., water) and the inner vortex includes the lighter, less dense fluid (e.g., gas). The outer vortex moves water downward under the force of gravity whereas the inner vortex moves gas upward, against the force of gravity, into the first vortex finder 138a. The water-gas mixture is separated by the vortexes. The water is discharges by the first annular gap 191a at the first underflow portion 150a and the gas is discharged by the second end of the first vortex finder 138a.

Simultaneously, in the second cyclone device 106b, from the second inlet section 120b, the fluid mixture continues through the first inlet section to the second scroll 126b and exits the second scroll outlet 162b into the second barrel 134b. The velocity of the fluid mixture decreases from the second inlet section 120b to the outlet 162b of the second scroll 126b due to the gradual increase in cross sectional area from the first end 122b of the second inlet section 120b to the outlet 162b of the second scroll 126b. The second scroll 126b also guides the fluid mixture to rotate or swirl around the second axis 136b so that the fluid mixture has a swirling pattern when tangentially entering the second barrel 134b. The fluid mixture continues to swirl around the second axis 136b creating an outer vortex moving downward and an inner vortex moving upward. The outer vortex, due to centrifugal forces, includes the heavier, denser liquid (e.g., water, oil, natural gas, or a mixture thereof) and the inner vortex includes the lighter, less dense fluid (e.g., gas). The outer vortex moves liquid (e.g., water, oil, natural gas, or a mixture thereof) downward under the force of gravity whereas the inner vortex moves gas upward, against the force of gravity, into the second vortex finder 138b. The liquid-gas mixture is separated by the vortexes. The water is discharged by the second annular gap 191b at the second underflow portion 150b and the gas is discharged by the second end of the second vortex finder 138b.

Figure 13:
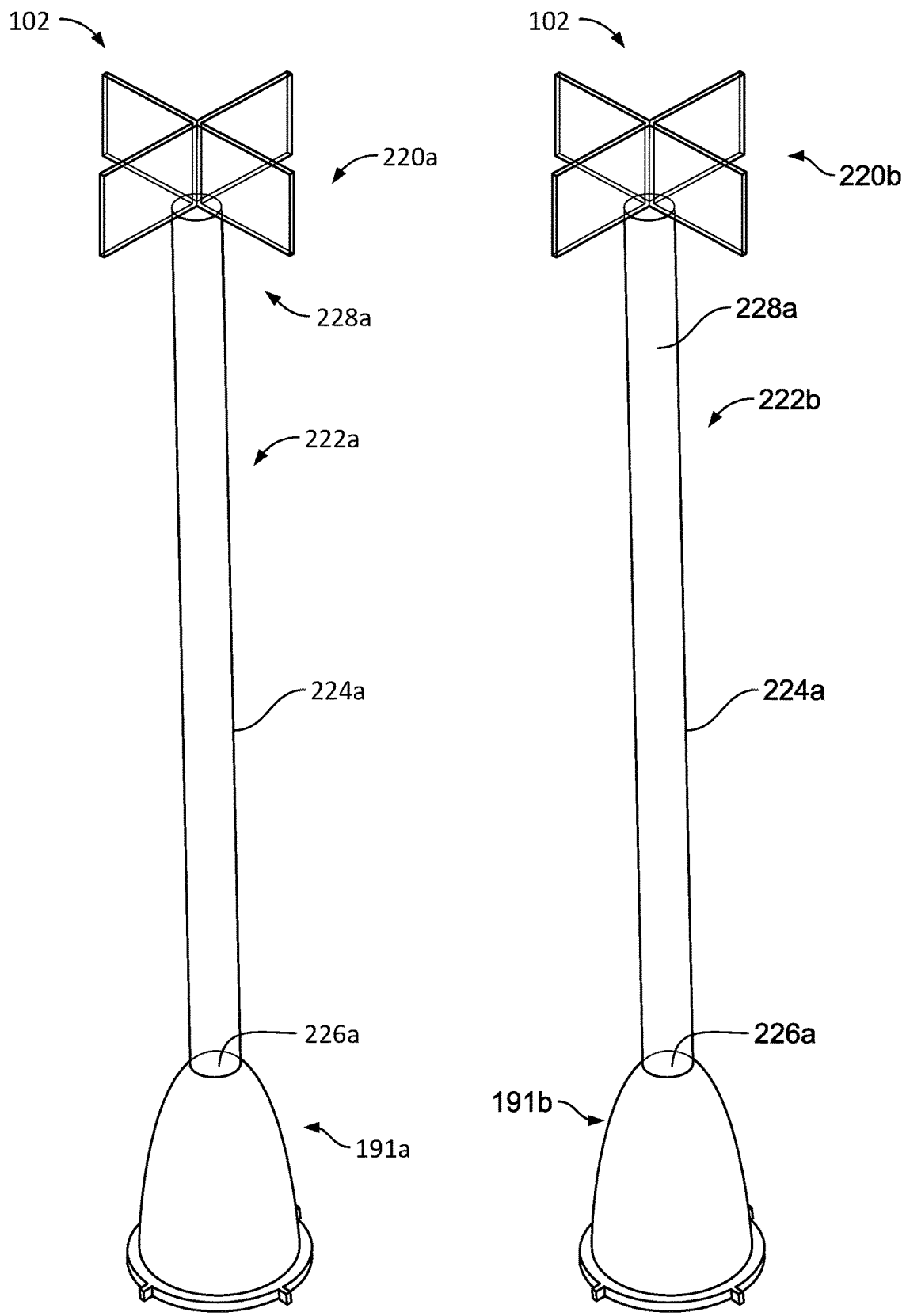
FIG. 13 is a perspective view of the first insert, a first vortex breaker, the second insert, and a second vortex breaker of the separator apparatus.

FIG. 13 is a perspective view of the first insert 190a, a first vortex breaker 220a, the second insert 190b, and a second vortex breaker 220b of the separator apparatus 102.

In some systems, a tail of a generated inner vortex can be unstable, producing swings or oscillation of the tail. The first cyclone device 106a can include a vortex stabilizer 222a attached to the first insert 190a. The stabilizer can stabilize the inner vortex, reducing swinging and improving operational efficiency. The stabilizer 222a has an arm 224a attached at a first end 226a to the first insert 190a. The first insert may have an opening that receives the arm. The vortex breaker 220a is attached to a second end 228a of the arm 224a. The vortex breaker 220a is arranged in the first end 180a of the vortex finder 138aIn use, the stabilizer 222a breaks the rotational motion of the gas in the inner vortex which counteracts the low-pressure region generated by the gas, inside first barrel 134a. Disrupting the low-pressure region may prevent a large pressure drop and re-entrainment of already separated liquid droplets.

The second cyclone device 106b can include a stabilizer 222b attached to the second insert 190b. The stabilizer can stabilize the inner vortex, reducing swinging and improving operational efficiency. The stabilizer 222b has an arm 224b attached at a first end 226b to the second insert 191b. The second insert may have an opening that receives the arm. The vortex breaker 220b is attached to a second end 228b of the arm 224b. The vortex breaker 220b is arranged in the first end 180b of the second vortex finder 138b. In some systems, the vortex breaker is static relative to the arm and/or the second insert. In use, the stabilizer 222b breaks the rotational motion of the gas in the inner vortex which counteracts the low-pressure region, generated by the gas inside first barrel 134b. Disrupting the low-pressure region may prevent a large pressure drop and re-entrainment of already separated liquid droplets.

While the first and second vortex finders have been described as cylinders, some vortex finders can include or can be a venturi (convergent-divergent) tube.

While the separator apparatus has been described with a first and second insert, some apparatuses do not have inserts. In such a configuration, the first end of the conical member defines a circular outlet through which the denser fluid exits.

While the system has been described with respect to two phase mixtures (e.g., liquid-liquid and liquid-oil), the system can be used with three phase mixtures.

While the system has been described with an annular gap partially defined by the insert, in some cases the underflow section is a circular pipe with or without an insert or vortex breaker. In this configuration, the liquid flows through the cross sectional area of the pipe.

While the insert has been described as mounted to the first end of the conical member, some inserts are mounted to the second end of the conical member.

In some systems, the insert is a disk, for example a circular disk.

A number of embodiments have been described. Nevertheless, it will be understood that various modifications may be made without departing from the spirit and scope. Accordingly, other embodiments are within the scope of the following claims.

What is claimed is:

1. A separator apparatus comprising:
    a first cyclone device comprising:
        a first inlet section having a first end and a second end, wherein a cross-sectional area of the first inlet section increases from the first end to the second end;
        a first scroll comprising a curved member;
        a first barrel centered on a first axis, the barrel defining a first interior volume, the first barrel having a diameter, a first end, and a second end, wherein the scroll is attached to the first inlet section and to the first barrel, and connects the first inlet section to the first barrel;
        a first vortex finder comprising a first vortex tube arranged concentrically on the first axis in the first barrel on the first axis adjacent the first end of the first barrel; and
        a first underflow portion comprising a first conical member and a first underflow body, the first underflow portion defining a first annular gap in fluid connection with the first interior volume;
    a second cyclone device comprising:
        a second inlet section having a first end and a second end, wherein a cross-sectional area of the second inlet section increases from the first end to the second end;
        a second scroll;
        a second barrel centered on a second axis, the barrel defining a second interior volume, the second barrel having a diameter, a first end, and a second end, wherein the scroll connected the second inlet section to the second barrel;
        a second vortex finder having a second vortex tube arranged on the second axis concentrically in the second barrel on the axis adjacent the first end of the second barrel; and
        a second underflow portion having a second conical member and a second underflow cylinder, the second underflow portion defining a second annular gap in fluid connection with the second interior volume; and
    an intake nozzle fluidly connected to the first inlet section and second inlet section.

2. The separator apparatus of claim 1, wherein the first conical member comprises:

a first cone connected to the barrel at the second end, the first cone having a first diameter at a first end and a second diameter at a second end, wherein the first diameter is equal to the diameter of the barrel, wherein the first diameter is greater than the second diameter.

3. The separator apparatus of claim 2, wherein the curved member is a circular ramp.

4. The separator apparatus of claim 2, wherein the first underflow body comprises:
an inner cylinder having an exterior surface and an interior surface, wherein the exterior surface of the inner cylinder and the first end of the first cone define the first annular gap.

5. The separator apparatus of claim 4, wherein the first underflow portion further comprises a first insert arranged in the underflow body, wherein the first insert has a diameter.

6. The separator apparatus of claim 5, wherein the interior surface of the inner cylinder defines an opening with a diameter; wherein the diameter of the opening is equal to the diameter of the first insert.

7. The separator apparatus of claim 5, wherein the first cyclone device further comprises:
a stabilizer attached to the first insert.

8. The separator apparatus of claim 7, wherein the stabilizer comprises an arm, attached at a first end to the first insert, and a vortex breaker attached to a second end of the arm.

9. The separator apparatus of claim 4, wherein the second underflow portion comprises:
a second cone connected to the barrel at the second end, the cone having a first diameter at a first end and a second diameter at a second end, wherein the first diameter is equal to the diameter of the barrel, wherein the first diameter is greater than the second diameter; and
a second underflow body defining the second annular gap.

10. The separator apparatus of claim 1, wherein the second conical member comprises:
a second cone connected to the barrel at the second end, the cone having a first diameter at a first end and a second diameter at a second end, wherein the first diameter is equal to the diameter of the barrel, wherein the first diameter is greater than the second diameter; and
a second underflow body.

11. The separator apparatus of claim 10, wherein the second underflow body comprises:
an inner cylinder having an exterior surface and an interior surface; wherein the exterior surface of the inner cylinder and the second cone define the second annular gap.

12. The separator apparatus of claim 11, wherein the second underflow portion further comprises a second insert arranged in the underflow body, wherein the second insert has a diameter.

13. The separator apparatus of claim 12, wherein the interior surface of the inner cylinder defines an opening with a diameter; wherein the diameter of the opening is equal to the diameter of the second insert.

14. The separator apparatus of claim 12, wherein the second cyclone device further comprises:
a stabilizer attached to the second insert.

15. The separator apparatus of claim 14, wherein the stabilizer comprises an arm, attached at a first end to the second insert, and a vortex breaker attached to a second end of the arm.

16. The separator apparatus of claim 1, wherein the first inlet section is adjacent the second inlet section, wherein a divider separates the first inlet section and the second inlet section.

17. The separator apparatus of claim 1, further comprising a first feed chamber defined in the annular space between the first barrel and the first vortex finder.

18. The separator apparatus of claim 1, further comprising a second feed chamber defined in the annular space between the second barrel and the second vortex finder.

19. The separator apparatus of claim 1, wherein the first vortex tube comprises a first entrance in the first interior volume of the first barrel and a first discharge outlet, wherein the first discharge outlet extends through the first end of the first barrel.

20. The separator apparatus of claim 19, wherein the second vortex tube comprises a second entrance in the second interior volume of the second barrel and a second discharge outlet, wherein the second discharge outlet extends through the first end of the second barrel.

21. The separator apparatus of claim 20, wherein the second inlet section is configured to receive a mixture having a first substance and a second substance, and wherein the second vortex tube is configured to receive the first substance at the second entrance and discharge the first substance at the second discharge outlet.

22. The separator apparatus of claim 21, wherein the first substance is lighter than the second substance.

23. The separator apparatus of claim 19, wherein the first inlet section is configured to receive a mixture having a first substance and a second substance, and wherein the first vortex tube is configured to receive the first substance at the first entrance and discharge the first substance at the first discharge outlet.

24. The separator apparatus of claim 23, wherein the first substance is lighter than the second substance.

25. The separator apparatus of claim 1, wherein the first scroll has a first end fluidly connected to the first inlet section and a second end fluidly connected to the first interior volume of the first barrel.

26. The separator apparatus of claim 25, wherein the cross sectional area of the first scroll increases from the first end to the second end.

27. The separator apparatus of claim 1, wherein the second scroll has a first end fluidly connected to the second inlet section and a second end fluidly connected to the second interior volume of the second barrel.

28. The separator apparatus of claim 27, wherein the cross sectional area of the second scroll increases from the first end to the second end.

29. The separator apparatus of claim 1, wherein the first vortex finder has a length, wherein the length is about 1.1 times to about 1.3 times the diameter of the first barrel.

30. The separator apparatus of claim 1, wherein the second vortex finder has a length, wherein the length is about 1.1 times to about 1.3 times the diameter of the second barrel.

31. The separator apparatus of claim 1, wherein the first barrel has a length, wherein the length is about 1.5 times the diameter of the first barrel.

32. The separator apparatus of claim 1, wherein the second barrel has a length, wherein the length is about 1.5 times the diameter of the second barrel.

33. The separator apparatus of claim 1, wherein the first cone has a length, wherein the length is about 1 to about 1.5 times the diameter of the first barrel.

34. The separator apparatus of claim 1, wherein the second cone has a length, wherein the length is about 1 to about 1.5 times the diameter of the second barrel.

\* \* \* \* \*